US010760825B2

(12) United States Patent
Tamaoki et al.

(10) Patent No.: US 10,760,825 B2
(45) Date of Patent: Sep. 1, 2020

(54) REFRIGERATION DEVICE

(71) Applicant: PHC HOLDINGS CORPORATION, Tokyo (JP)

(72) Inventors: Yuichi Tamaoki, Gunma (JP); Takahiro Inoue, Gunma (JP); Minoru Suto, Gunma (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 145 days.

(21) Appl. No.: 16/048,029

(22) Filed: Jul. 27, 2018

(65) Prior Publication Data

US 2018/0347863 A1 Dec. 6, 2018

Related U.S. Application Data

(63) Continuation of application No. PCT/JP2017/003835, filed on Feb. 2, 2017.

(30) Foreign Application Priority Data

Feb. 17, 2016 (JP) .................................. 2016-028126

(51) Int. Cl.
*F25B 9/00* (2006.01)
*F25B 7/00* (2006.01)
(Continued)

(52) U.S. Cl.
CPC ................ *F25B 9/004* (2013.01); *F25B 1/00* (2013.01); *F25B 6/04* (2013.01); *F25B 7/00* (2013.01);
(Continued)

(58) Field of Classification Search
CPC ................ F25B 7/00; F25B 2600/0253; F25B 2700/21; F25B 49/02
(Continued)

(56) References Cited

U.S. PATENT DOCUMENTS 6,564,568 B1* 5/2003 Shen ..................... F25B 49/025
361/22
2010/0326109 A1* 12/2010 Tobe ........................ F25B 7/00
62/228.1
(Continued)

FOREIGN PATENT DOCUMENTS

JP 2004-190917 A 7/2004
JP 2013-068409 A 4/2013
KR 10-2014-0120096 A 10/2014

OTHER PUBLICATIONS

Extended European Search Report dated Jan. 4, 2019, issued in the corresponding European Patent No. 17752985.6.

*Primary Examiner* — Marc E Norman
*Assistant Examiner* — Heather J Huddle
(74) *Attorney, Agent, or Firm* — McDermott Will & Emery LLP

(57) ABSTRACT

A refrigeration device equipped with: a cascade cycle; a storage unit having a storage space for an object to be cooled by a second evaporator; an internal temperature sensor that detects the temperature of the storage space; a control unit that determines a second rotational speed of a second compressor on the basis of a target temperature for the storage space and the detection result from the internal temperature sensor, and that determines a first rotational speed for a first compressor having a prescribed correspondence relationship with the second rotational speed; and a first power supply unit and a second power supply unit that supply power respectively to the first compressor and the second compressor on the basis of the first rotational speed and the second rotational speed determined by the control unit.

14 Claims, 20 Drawing Sheets

(51) Int. Cl.
*F25B 1/00* (2006.01)
*F25B 49/02* (2006.01)
*F25B 6/04* (2006.01)
*F25B 15/00* (2006.01)
*F25B 41/06* (2006.01)

(52) U.S. Cl.
CPC .......... *F25B 15/006* (2013.01); *F25B 41/062* (2013.01); *F25B 49/025* (2013.01); *F25B 2341/065* (2013.01); *F25B 2341/0683* (2013.01); *F25B 2600/0253* (2013.01); *F25B 2600/2513* (2013.01); *F25B 2700/171* (2013.01); *F25B 2700/2104* (2013.01); *F25B 2700/2106* (2013.01); *F25B 2700/2115* (2013.01); *F25B 2700/21161* (2013.01); *F25B 2700/21174* (2013.01); *F25B 2700/21175* (2013.01)

(58) Field of Classification Search
USPC .......................................................... 62/175
See application file for complete search history.

(56) References Cited

U.S. PATENT DOCUMENTS

2011/0072836 A1* 3/2011 Wang ................... F25B 7/00
  62/79
2015/0330651 A1* 11/2015 Goel .................... G05B 15/02
  700/276

* cited by examiner

REFRIGERATION DEVICE

This application is a Continuation application of International Application No. PCT/JP2017/003835 filed on Feb. 2, 2017, which claims the benefit of Japanese Application No. 2016-028126 filed on Feb. 17, 2016, the entire contents of each are hereby incorporated by reference.

TECHNICAL FIELD

The present invention relates to a refrigeration apparatus provided with a cascade cycle.

BACKGROUND ART

For example, Patent Literature 1 describes a conventional refrigeration apparatus of this type. According to the conventional refrigeration apparatus, a controller starts a compressor (high-temperature side compressor) constituting a primary side refrigerant circuit based on an internal temperature of a freezer output from a temperature sensor during a normal operation, and then starts a compressor (low-temperature side compressor) of a secondary side refrigerant circuit after an elapse of a predetermined time. When the internal temperature reaches an upper limit of a target value, the controller initially starts the primary side refrigerant circuit including the high-temperature side compressor based on output from the temperature sensor which detects the internal temperature. Thereafter, the controller opens an electromagnetic valve provided between the compressor and an evaporator in the secondary side refrigerant circuit, and starts the low-temperature side compressor. Thereafter, the controller executes such control as to open an electromagnetic valve provided between a cascade condenser and an expander in the secondary side refrigerant circuit.

CITATION LIST

Patent Literature

PTL 1
Japanese Patent Application Laid-Open No. 2004-190917

SUMMARY OF INVENTION

Technical Problem

There has been a demand for a refrigeration apparatus of this type which is capable of rapidly returning an internal temperature (i.e., temperature of storage space for cooling target) to a target value at the time of a rise of the internal temperature.

Accordingly, an object of the present invention is to provide a refrigeration apparatus capable of rapidly returning a temperature of a storage space to a target value at the time of a rise of the temperature.

Solution to Problem

A refrigeration apparatus according to an aspect of the present invention includes: a first cooling section disposed such that a first compressor, a first condenser, a first expander, and a first evaporator achieve fluid communication with one another in a first fluid circuit through which first refrigerant circulates; a second cooling section disposed such that a second compressor, a second condenser that constitutes a cascade condenser in cooperation with the first evaporator, a second expander, and a second evaporator achieve fluid communication with one another in a second fluid circuit through which second refrigerant circulates; a storage section that includes a storage space for a cooling target cooled by the second evaporator, an internal temperature sensor that detects a temperature of the storage space; a control section that determines a second rotation speed of the second compressor based on a target temperature of the storage space and a detection result obtained by the internal temperature sensor, and determines a first rotation speed of the first compressor, the first rotation speed having a predetermined correspondence relation with the second rotation speed; and a first power supply section and a second power supply section that supply power to the first compressor and the second compressor, respectively, based on the first rotation speed and the second rotation speed determined by the control section, respectively.

Advantageous Effects of Invention

Provided according to the above aspect is a refrigeration apparatus capable of rapidly returning a temperature of a storage space to a target value at the time of a rise of the temperature.

DESCRIPTION OF EMBODIMENTS

1. Details of Technical Problem

Figure 1:
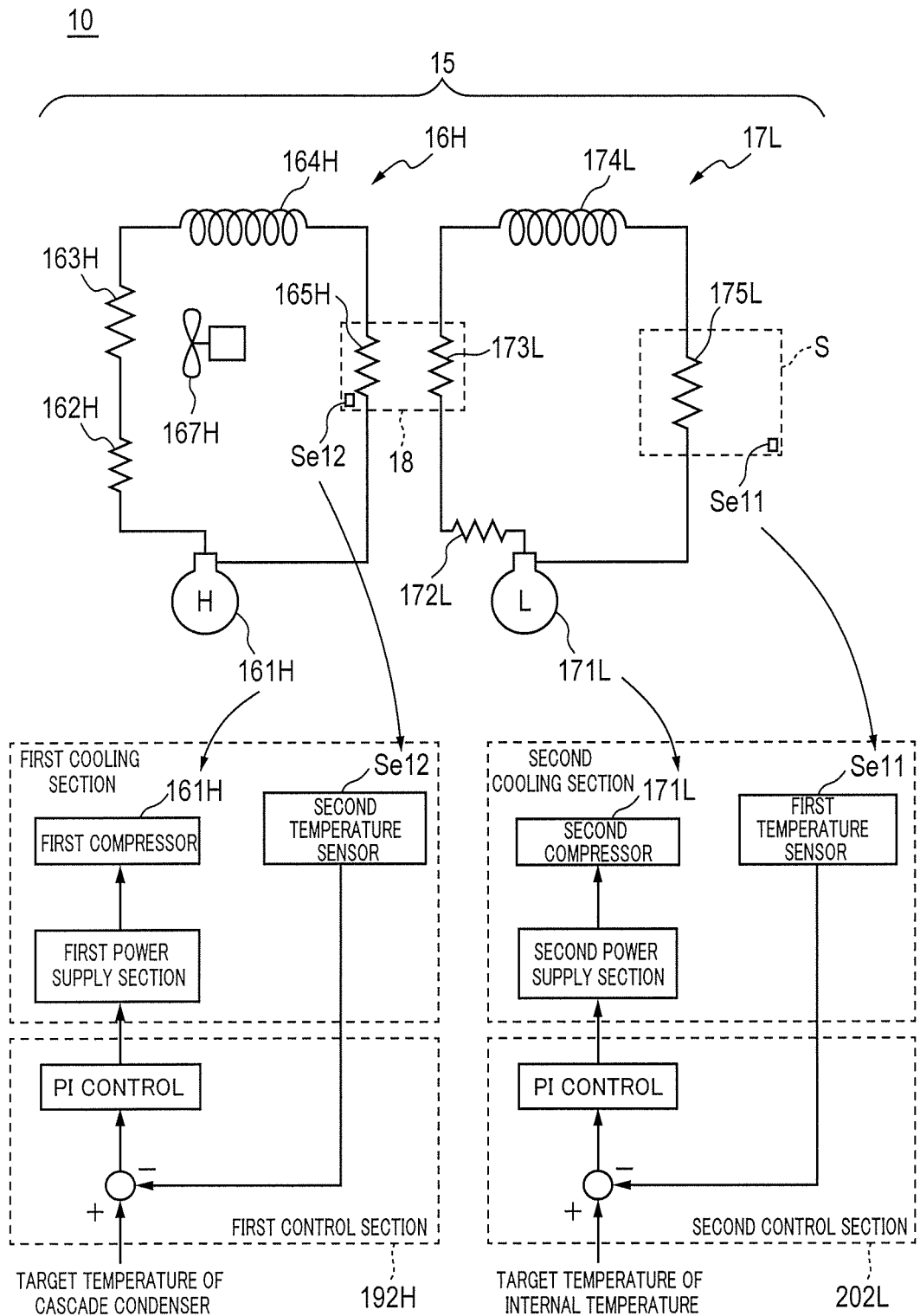
FIG. 1 is a diagram illustrating a relationship between a cooling section and a block configuration of a control system included in a refrigeration apparatus according to a comparative example.

A technical problem of internal temperature control performed by refrigeration apparatus 10 according to a comparative example is described in detail before touching upon refrigeration apparatus 1 according to the present invention.

1-1. General Configuration of Refrigeration Apparatus 10 of Comparative Example Refrigeration apparatus 10 according to the comparative example in FIG. 1 includes cooling section 15. Cooling section 15 includes first cooling section 16H and second cooling section 17L.

First compressor 161H in first cooling section 16H compresses first refrigerant, and discharges high-temperature and high-pressure gas refrigerant. First front stage condenser 162H and first rear stage condenser 163H cool discharge refrigerant received from first compressor 161H, and discharge the cooled refrigerant. Fan 167H is disposed herein in the vicinity of both condensers 162H and 163H. An airflow produced by fan 167H promotes cooling of the first refrigerant passing through both condensers 162H and 163H. First expander 164H depressurizes discharge refrigerant received from first rear stage condenser 163H, and discharges the depressurized discharge refrigerant. First evaporator 165H evaporates discharge refrigerant received from first expander 164H, and discharges the evaporated discharge refrigerant.

Second compressor 171L of second cooling section 17L compresses second refrigerant which has a boiling point lower than a boiling point of the first refrigerant, and discharges high-temperature and high-pressure gas refrigerant. Both condensers 172L and 173L compress discharge refrigerant received from second compressor 171L, and discharge the condensed discharge refrigerant. Second rear stage condenser 173L constituting cascade condenser 18 in cooperation with first evaporator 165H cools passing refrigerant which passes through second rear stage condenser 173L by utilizing endothermic reaction of the first refrigerant at first evaporator 165H, and discharges middle-temperature and high-pressure refrigerant. Second expander 174L depressurizes discharge refrigerant received from second rear stage condenser 173L, and discharges the depressurized discharge refrigerant. Second evaporator 175L evaporates discharge refrigerant received from second expander 174L, and discharges the evaporated discharge refrigerant.

Second evaporator 175L is affixed onto an outer peripheral surface of an interior body which defines storage space S. Heat of storage space S shifts toward second evaporator 175L by endothermic reaction caused during evaporation of the second refrigerant at second evaporator 175L. As a result, a cooling target within storage space S is cooled.

Cooling section 15 includes at least first temperature sensor Se11 which detects a temperature inside storage space S, and second temperature sensor Se12 which detects a temperature inside cascade condenser 18.

First control section 192H included in refrigeration apparatus 10 constitutes a first feedback system in cooperation with second temperature sensor Se12, and controls a rotation speed of first compressor 161H based on a deviation between a temperature detected by second temperature sensor Se12, and a target temperature of cascade condenser 18. In addition, second control section 202L constitutes a second feedback system in cooperation with first temperature sensor Se11, and controls a rotation speed of second compressor 171L based on a deviation between a temperature detected by first temperature sensor Se11, and a target temperature inside storage space S.

1-2. Problem of Internal Temperature Control Arising from Comparative Example For example, a warm load, such as opening of a door, may be applied to storage space S cooled to a target temperature (approximately −80° C.). In this case, there arises a first problem from the internal temperature control of the comparative example, i.e., a problem that the temperature inside storage space S is difficult to rapidly return to the target temperature. In addition to the first problem, there arises a second problem from the internal temperature control of the comparative example, i.e., a problem that unnecessary increase and decrease in the respective rotation speeds of the first compressor and the second compressor may cause a waste of energy. Both the foregoing problems are hereinafter detailed with reference to FIGS. 1 and 2.

Figure 2:
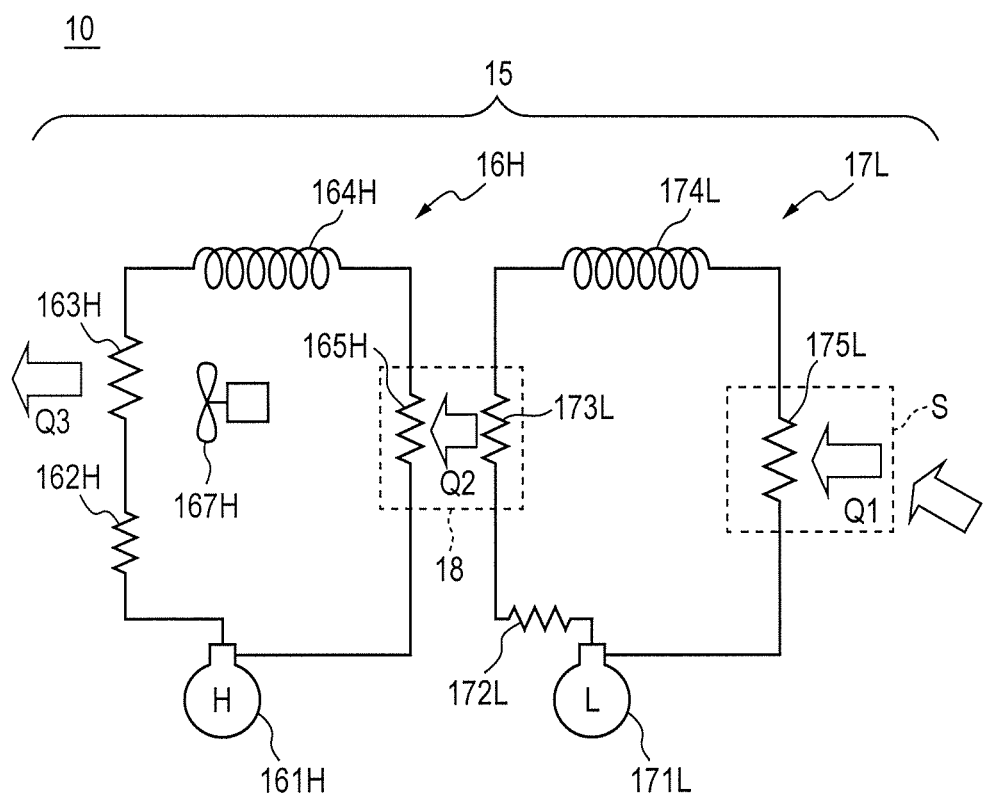
FIG. 2 is a schematic view illustrating a shift of heat in the cooling section in FIG. 1.

When a warm load is applied to storage space S having a temperature of approximately −80° C. in FIG. 2, heat quantity Q1 is given to the second feedback system as disturbance. Second control section 202L increases the rotation speed of second compressor 171L and thereby raises a flow amount of the second refrigerant flowing from second compressor 171L toward cascade condenser 18 to return the temperature inside storage space S to the target temperature. However, a time is required to shift the second refrigerant having absorbed heat quantity Q1 to cascade condenser 18 after the absorption of heat quantity Q1 by the second refrigerant. In other words, heat quantity Q2 is generated at cascade condenser 18 after an elapse of a predetermined delay time from the increase in the rotation speed of second compressor 171L. Heat quantity Q2 contains a part of work W1 of second compressor 171L as well as heat quantity Q1 generated by disturbance.

When the disturbance is transmitted to the first feedback system as a temperature rise of cascade condenser 18, first control section 192H increases the rotation speed of first compressor 161H. As a result, a flow amount of the first refrigerant flowing between first compressor 161H and first front stage condenser 162H increases, wherefore heat quantity Q3 is released from both condensers 162H and 163H to the outside of refrigeration apparatus 10. Heat quantity Q3 herein contains a part of work W2 of first compressor 161H as well as heat quantity Q2 (=Q1+W1). Accordingly, a time is required to release heat quantity Q1 generated by disturbance to the outside of refrigeration apparatus 10.

In addition, as apparent from the above description, the temperature of cascade condenser 18 does not immediately follow the increase or decrease in the rotation speed of second compressor 171L. Accordingly, even after second control section 202L returns the rotation speed of second compressor 171L to the original speed based on a deviation of substantially zero between the detection temperature of first temperature sensor Se11 and the target temperature, the temperature inside storage space S continues decreasing for a while. Moreover, the high-temperature and high-pressure second refrigerant also flows in both condensers 172L and 173L for a while. Accordingly, first compressor 161H is also rotated under control by first control section 192H to decrease the temperature of cascade condenser 18. As can be understood, heat transmission delay, interference or others may be caused between the first feedback system and the second feedback system in the comparative example. Accordingly, a time is required to return the temperature of storage space S to the target temperature once the temperature of storage space S is raised.

Furthermore, unnecessary increase or decrease in the rotation speeds of both compressors 161H and 171L is made during the time for returning the temperature of storage space S to the target temperature. As a result, a waste of energy is produced in the internal temperature control according to the comparative example.

In consideration of the aforementioned problems, an object of the present embodiment is to provide refrigeration apparatus 1 capable of rapidly returning a temperature inside storage space S and thereby reducing a waste of energy.

2. Embodiments

Refrigeration apparatus 1 according to respective embodiments is hereinafter detailed with reference to FIG. 3 and following figures.

2-1. Definition

Figure 3:
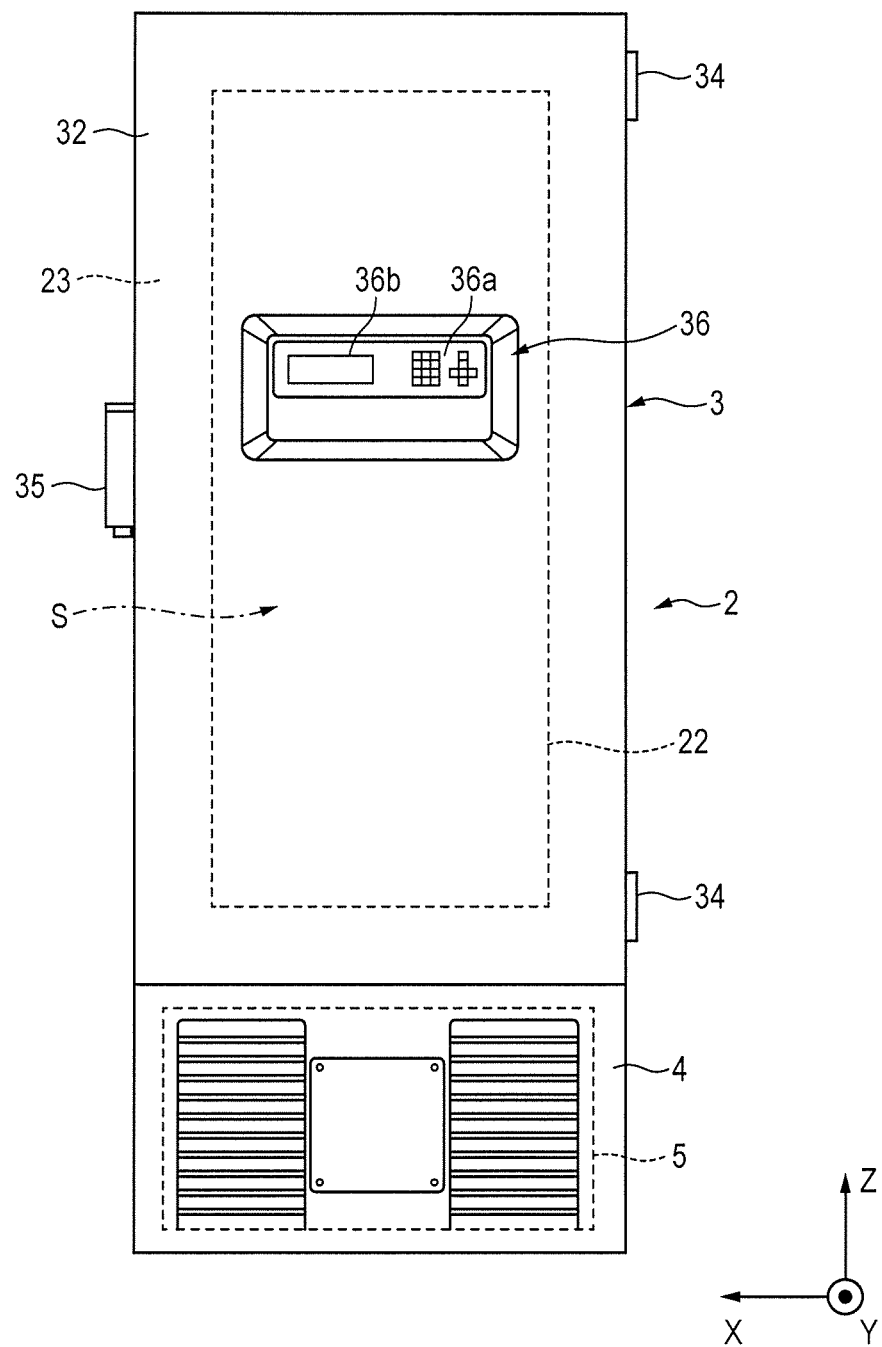
FIG. 3 is a front view of a refrigeration apparatus according to Embodiment 1 of the present invention.
Figure 4:
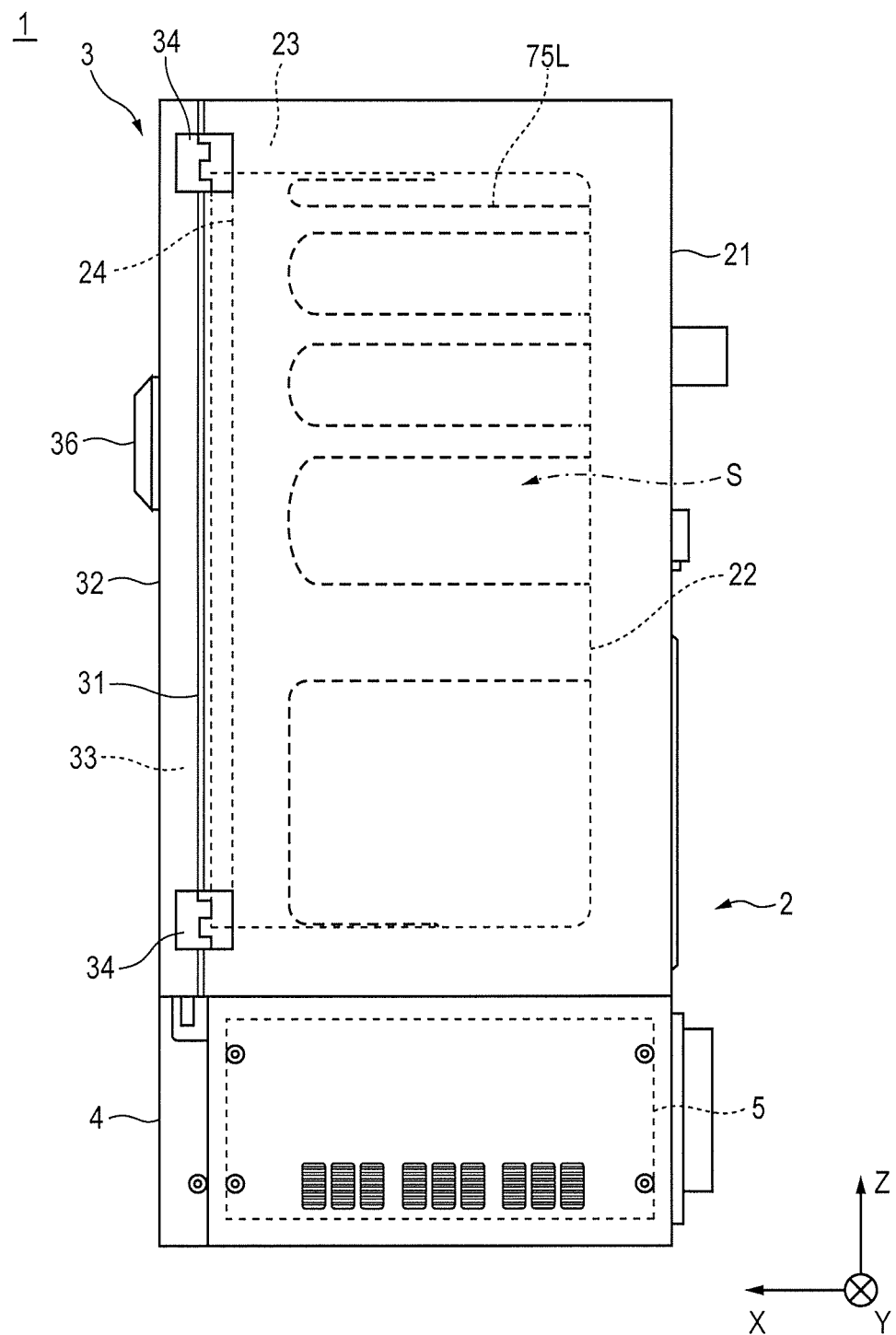
FIG. 4 is a right side view of the present refrigeration apparatus.

In FIGS. 3 and 4, an X axis indicates a transverse direction of refrigeration apparatus 1 (more specifically, direction from right to left as viewed from user facing refrigeration apparatus 1). A Y axis indicates a front-rear direction of refrigeration apparatus 1 (more specifically, direction from depth side (rear side) to near side (front side) as viewed from foregoing facing position of user). In addition, a Z axis indicates an up-down direction of refrigeration apparatus 1 (more specifically, direction from lower side to upper side of refrigeration apparatus 1).

2-2. External Appearance of Refrigeration Apparatus 1

As illustrated in FIGS. 3 and 4, refrigeration apparatus 1 generally includes heat insulation housing 2, heat insulation door 3, and mechanical chamber 4.

Heat insulation housing 2 generally includes exterior body 21, interior body 22, and foam heat insulation material 23. Each of exterior body 21 and interior body 22 is made of metal, for example, and opens on the front side. Exterior body 21 defines an external shape of heat insulation housing 2. Interior body 22 is provided inside exterior body 21, and defines space S for storing a cooling target (hereinafter referred to as storage space). Storage space S also opens on the front side. Foam heat insulation material 23 is made of synthetic resin foam body, vacuum heat insulation material or the like, and provided between exterior body 21 and interior body 22. Note that configurations not visually recognizable from the outside, such as foam heat insulation material 23, are represented by dotted lines and chain lines in FIGS. 3 and 4.

Note that inner door 24, which is made of resin, for example, is preferably attached to the front side of interior body 22 in a manner freely openable and closable. An opening of storage space S is closed by inner door 24 in a closed state. On the other hand, in an opened state of inner door 24, the user is allowed to access storage space S. Inner door 24 thus provided increases a heat insulation effect inside storage space S.

For example, heat insulation door 3 includes interior body 31 and exterior body 32 each made of metal, and foam heat insulation material 33 filling a space between interior body 31 and exterior body 32. Heat insulation door 3 rotates around a rotation center axis of two hinges 34 to open and close in accordance with an operation by the user. An opening of heat insulation housing 2 is closed by heat insulation door 3 in a closed state. On the other hand, in an opened state of heat insulation door 3, the user is allowed to open or close inner door 24 described above.

Note that handle 35 is provided on heat insulation door 3 to be held by the user at the time of opening or closing. Handle 35 preferably has a lock mechanism (not shown). The lock mechanism locks heat insulation door 3 in the closed state, and cancels the locked state to open heat insulation door 3.

Control panel 36 is further provided on a front face of exterior body 32 of heat insulation door 3. Control panel 36 contains control circuit board 9 (see FIG. 6) inside, and further includes keyboard 36a and display 36b in a condition operable and visible by the user. Keyboard 36a is a device through which the user inputs settings such as a target temperature of storage space S (i.e., target value SV of internal temperature), while display 36b is a device which displays various types of information such as a current set temperature (target value SV of internal temperature).

For example, mechanical chamber 4 is provided in a lower part of heat insulation housing 2. Mechanical chamber 4 stores cooling section 5 except for second evaporator 75L (see FIG. 5) described below.

2-3. Configuration of Cooling Section 5

Figure 5:
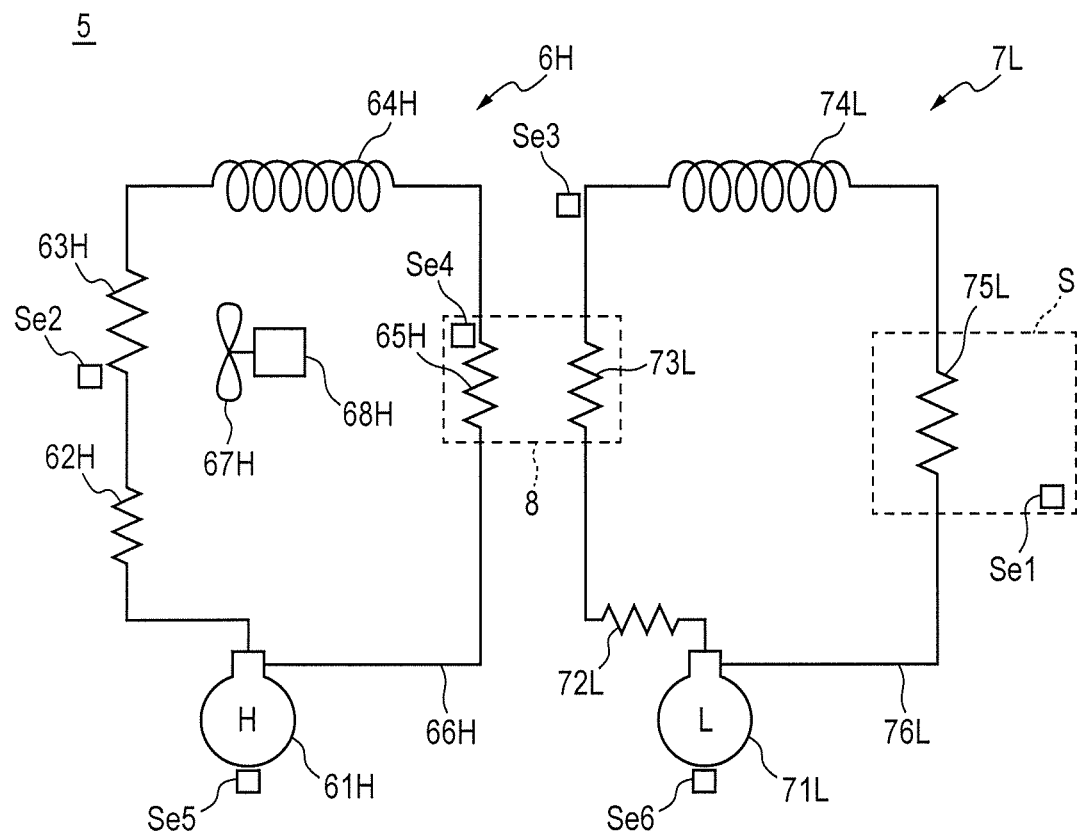
FIG. 5 is a diagram illustrating an example of a cooling section included in the present refrigeration apparatus.

As illustrated in FIG. 5, cooling section 5 includes first cooling section 6H and second cooling section 7L.

First cooling section 6H is a high-temperature side cooling section in a what is known as cascade cycle. First compressor 61H, first front stage condenser 62H, first rear stage condenser 63H, first expander 64H, and first evaporator 65H are connected in an annular shape in such a manner as to achieve fluid communication with one another in this order to cause a flow of first refrigerant in first fluid circuit 66H of first cooling section 6H.

First compressor 61H compresses the sucked first refrigerant, and discharges high-temperature and high-pressure gas refrigerant.

Each of first front stage condenser 62H and first rear stage condenser 63H is a condenser produced by winding a tube member made of copper or aluminum, and configured to cool and condense the first refrigerant discharged from first compressor 61H, and discharge middle-temperature and high-pressure refrigerant. First front stage condenser 62H is also available as a heat source for achieving dew condensation prevention of respective sections of refrigeration apparatus 1, as well as for cooling the first refrigerant.

Fan 67H is disposed herein in mechanical chamber 4 in the vicinity of first front stage condenser 62H and first rear stage condenser 63H. Fan 67H is rotated by driving force generated by motor 68H to apply air to first front stage condenser 62H and first rear stage condenser 63H. The air thus applied promotes heat release to the surrounding air from the first refrigerant flowing at first front stage condenser 62H and first rear stage condenser 63H. Note that two condensers 62H and 63H are presented by way of example of condensers included in first cooling section 6H according to the present embodiment. However, the number of condensers to be provided is not limited to two, but may be one or three or more as long as the first refrigerant can be cooled by the condensers.

First expander 64H is constituted by an expansion valve or a capillary tube, for example, and configured to expand and depressurize the middle-temperature and high-pressure first refrigerant discharged from first rear stage condenser 63H, and discharge low-temperature and low-pressure first refrigerant.

First evaporator 65H evaporates (vaporizes) the low-temperature and low-pressure first refrigerant discharged from first expander 64H, and discharges the evaporated first refrigerant. Discharge refrigerant from first evaporator 65H is sucked into first compressor 61H via first fluid circuit 66H. In this manner, the first refrigerant circulates in first fluid circuit 66H.

First evaporator 65H further constitutes cascade condenser 8 in cooperation with second rear stage condenser 73L described below. More specifically, cascade condenser 8 is constituted by first evaporator 65H and second rear stage condenser 73L integrated with each other to achieve heat exchange, and cools the second refrigerant at second rear stage condenser 73L by utilizing endothermic reaction caused during evaporation of the first refrigerant by first evaporator 65H. Cascade condenser 8 configured as above is constituted by any one of a receiver, a double tube, and a plate type heat exchanger, for example.

Second cooling section 7L is a low-temperature side cooling section in a what is known as cascade cycle. Second compressor 71L, second front stage condenser 72L, second rear stage condenser 73L, second expander 74L, and second evaporator 75L are connected in an annular shape in such a manner as to achieve fluid communication with one another in this order to cause a flow of the second refrigerant, which has a lower boiling point than a boiling point of the first refrigerant, in second fluid circuit 76L of second cooling section 7L.

Second compressor 71L compresses the sucked second refrigerant, and discharges high-temperature and high-pressure gas refrigerant.

Second front stage condenser 72L, which has configuration and function similar to the configuration and function of the first front stage condenser, condenses discharge refrigerant received from second compressor 71L, and discharges middle-temperature and high-pressure refrigerant. Note that second front stage condenser 72L, which is a supplemental condenser for cooling the second refrigerant on the upstream side with respect to cascade condenser 8, may be eliminated. In addition, two or more second front stage condensers 72L may be provided.

As described above, second rear stage condenser 73L constituting cascade condenser 8 in cooperation with first evaporator 65H further cools discharge refrigerant from second front stage condenser 72L by utilizing endothermic reaction of the first refrigerant caused at first evaporator 65H, and discharges middle-temperature and high-pressure refrigerant.

Second expander 74L having configuration and function similar to configuration and function of first expander 64H expands and depressurizes the middle-temperature and high-pressure second refrigerant discharged from second rear stage condenser 73L, and discharges the low-temperature and low-pressure second refrigerant.

Second evaporator 75L evaporates (vaporizes) the low-temperature and low-pressure second refrigerant discharged from second expander 74L, and discharges the evaporated second refrigerant. The discharge refrigerant from the second evaporator is sucked into second compressor 71L via second fluid circuit 76L. In this manner, the second refrigerant circulates in second fluid circuit 76L.

Also refer to FIG. 4 hereinafter. As illustrated in dotted lines in FIG. 4, second evaporator 75L is disposed between exterior body 21 and interior body 22, and affixed to an outer peripheral face of interior body 22. Heat from storage space S shifts toward second evaporator 75L by endothermic reaction caused during evaporation of the second refrigerant by second evaporator 75L. A cooling target within storage space S is cooled by the shift of heat.

2-4. Control System (Hardware Configuration) of Cooling Section 5

Pressure sensors or temperature sensors are provided at various positions on cooling section 5 described above. An important feature of the present embodiment is associated with first temperature sensor Se1, second temperature sensor Se2, third temperature sensor Se3, fourth temperature sensor Se4, fifth temperature sensor Se5, and sixth temperature sensor Se6 illustrated in FIGS. 5 and 6.

As a typical example of an internal temperature sensor, first temperature sensor Se1 is provided inside storage space S, and configured to detect a temperature of storage space S as an internal temperature, and output a signal indicating detection value PV of the internal temperature (hereinafter abbreviated as detection value PV of internal temperature) to control circuit board 9.

As a typical example of an ambient temperature sensor, second temperature sensor Se2 is provided at a position surrounding refrigeration apparatus 1 (e.g., vent hole (not shown) of fan 67H), and configured to detect an ambient temperature, and output a signal indicating a detection value of the ambient temperature (hereinafter abbreviated as detection value ST of ambient temperature) to control circuit board 9. Note that second temperature sensor Se2 may be further attached to a surface of exterior body 21 in a manner not affected by first rear stage condenser 63H (e.g., inside or surface of control panel 36) to detect an ambient temperature.

As an example of a second fluid circuit temperature sensor, third temperature sensor Se3 is attached to an intermediate position between second rear stage condenser 73L constituting cascade condenser 8, and second expander 74L in second fluid circuit 76L. Third temperature sensor Se3 disposed at this attachment position detects a temperature of the second refrigerant, and outputs a signal indicating a detection value of the second refrigerant temperature (hereinafter abbreviated as detection value of second refrigerant temperature) to control circuit board 9. Note that third temperature sensor Se3 is attached to the intermediate position between second rear stage condenser 73L and second expander 74L in second fluid circuit 76L by thermal coupling in view of attachment easiness according to the embodiment described herein. More specifically, an area around piping constituting the intermediate position between second rear stage condenser 73L and second expander 74L in second fluid circuit 76L is covered with a heat insulation material, such as glass wool. In this case, third temperature sensor Se3 is easily attachable, and less affected by the outside temperature. This configuration therefore produces such an advantage that the temperature of the second refrigerant is accurately detectable.

As an example of a cascade temperature sensor, fourth temperature sensor Se4 is attached to a refrigerant inlet side or refrigerant outlet side of first evaporator 65H in first fluid circuit 66H, for example, and is configured to detect a temperature of the first refrigerant, and output a signal indicating a detection value of the first refrigerant temperature (hereinafter abbreviated as detection value of first refrigerant temperature) to control circuit board 9. Note that FIG. 5 illustrates an example of fourth temperature sensor Se4 attached to the refrigerant inlet side.

Note that each of third temperature sensor Se3 and fourth temperature sensor Se4 may be attached to various positions other than the positions described above. Examples of other positions include following positions:

refrigerant inlet side and refrigerant outlet side of first evaporator 65H in first fluid circuit 66H, and intermediate position between the refrigerant inlet side and outlet side of first evaporator 65H refrigerant inlet side and refrigerant outlet side of second rear stage condenser 73L in second fluid circuit 76L, and intermediate position between the refrigerant inlet side and outlet side of second rear stage condenser 73L position close to refrigerant inlet of second expander 74L in second fluid circuit 76L In the configuration of first fluid circuit 66H and second fluid circuit 76L covered with glass wool or the like for heat insulation, each of third temperature sensor Se3 and fourth temperature sensor Se4 is capable of detecting an accurate temperature of refrigerant. Moreover, in the configuration covered with glass wool for heat insulation, attachment of third temperature sensor Se3 and fourth temperature sensor Se4 is more easily achievable than in case of fixation with urethane foam.

Moreover, fifth temperature sensor Se5 and sixth temperature sensor Se6 are attached to shell surfaces of first compressor 61H and second compressor 71L, respectively, and configured to output signals indicating detection values correlated to temperatures of first compressor 61H and second compressor 71L (hereinafter abbreviated as detection value of first compressor temperature and detection value of second compressor temperature) to control circuit board 9. Note that fifth temperature sensor Se5 and sixth temperature sensor Se6 may be attached to insides of the shells of first compressor 61H and second compressor 71L.

Figure 6:
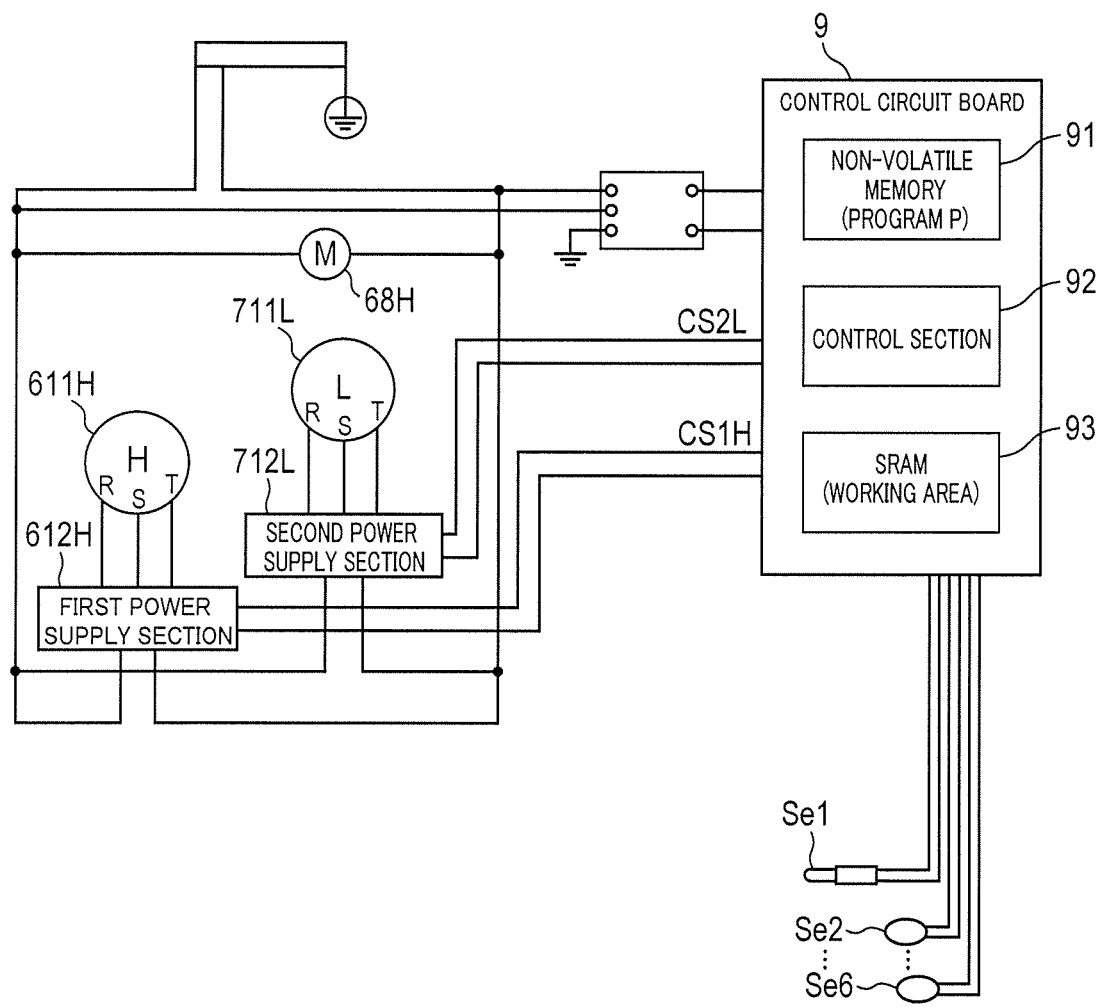
FIG. 6 is a diagram illustrating an example of a control system included in the present refrigeration apparatus.

In addition, control circuit board 9 is built in control panel 36 illustrated in FIG. 1. As illustrated in FIG. 6, at least non-volatile memory 91, at least control section 92, and a static random access memory (SRAM) 93 are mounted on control circuit board 9.

Non-volatile memory 91 is constituted by a flash memory, for example, and configured to store program P. Control section 92 is typically constituted by a microcomputer, and configured to execute program P by using SRAM 93 as a working area to perform controls of respective sections included in refrigeration apparatus 1. An important feature in these controls according to the present embodiment is associated with control of respective rotation speeds of first compressor 61H and second compressor 71L to adjust detection value PV of the internal temperature to target value SV. This control is hereinafter referred to as internal temperature control. According to the present embodiment, five types of internal temperature control will be presented by way of example in column 2-5 and following columns described below. Note that the respective rotation speeds of first compressor 61H and second compressor 71L are specifically a rotation speed of first motor 611H included inside first compressor 61H, and a rotation speed of second motor 711L included inside second compressor 71L, respectively.

Further specifically, control section 92 determines such rotation speeds of first motor 611H and second motor 711L at which deviation e between detection value PV and a target temperature of the internal temperature becomes substantially zero. Thereafter, control section 92 generates first control signal CS1H and second control signal CS2L indicating frequencies correlated with the rotation speed of first motor 611H and the rotation speed of second motor 711L, respectively. Control section 92 outputs first control signal CS1H and second control signal CS2L thus generated to first power supply section 612H and second power supply section 712L, respectively.

Each of first power supply section 612H and second power supply section 712L is an inverter circuit. First power supply section 612H changes a frequency of three-phase alternating current voltage based on input first control signal CS1H, and supplies the changed voltage to first motor 611H. Accordingly, first motor 611H rotates at a rotation speed proportional to the frequency of first control signal CS1 (i.e., rotation speed determined by control section 92). Second power supply section 712L changes a frequency of three-phase alternating current voltage based on input second control signal CS2L, and supplies the changed voltage to second motor 711L. Accordingly, second motor 711L rotates at a rotation speed proportional to the frequency of second control signal CS2 (i.e., rotation speed determined by control section 92).

2-5. Internal Temperature Control (Example 1)

Figure 7A:
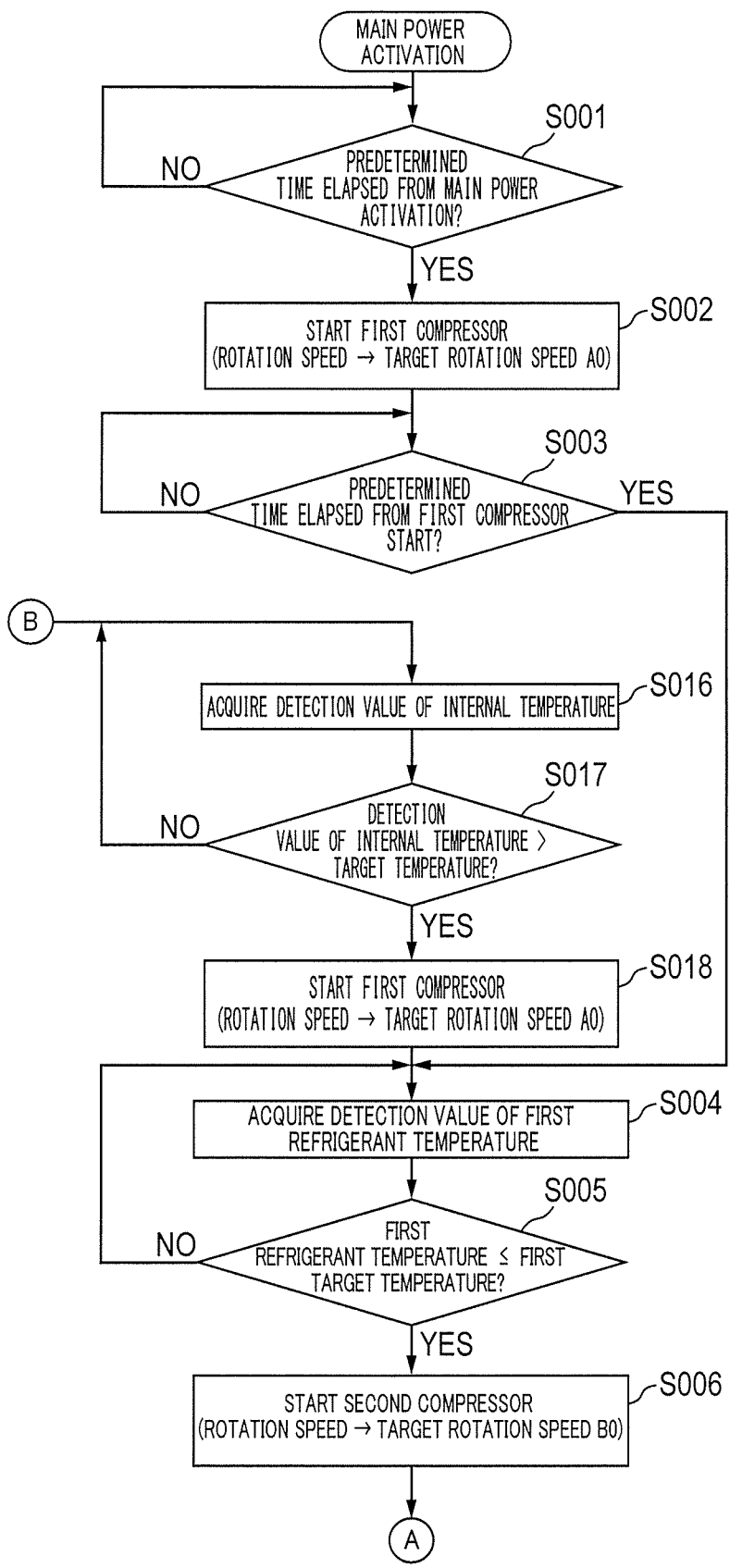
FIG. 7A is a flowchart showing a part of internal temperature control (Example 1) of the present refrigeration apparatus.

Example 1 of the internal temperature control is now described with reference to FIGS. 7A and 7B.

Control section 92 and others start by power activation. Control section 92 initially generates first control signal CS1H indicating a frequency corresponding to target rotation speed A0 to start first compressor 61H after an elapse of a predetermined time from the power activation (step S001). Target rotation speed A0 herein is preferably a highest possible rotation speed to reduce a temperature of cascade condenser 8 to an appropriate temperature as rapidly as possible. However, target rotation speed A0 may be a speed lower than the maximum rotation speed depending on a load or a capacity of the compressor. When first control signal CS1H is supplied to first power supply section 612H, first motor 611H (i.e., first compressor 61H) starts (step S002).

Subsequently, control section 92 acquires a detection value of the first refrigerant temperature from fourth temperature sensor Se4 (step S004) after an elapse of a predetermined time from the start of first motor 611H (first compressor 61H) (step S003), and then determines whether or not the acquired detection value of the first refrigerant temperature is lower than or equal to a first target temperature determined beforehand (step S005). When determination is NO in this step, control section 92 again executes step S004.

On the other hand, when determination is YES in step S005, control section 92 considers that first cooling section 6H has come into a state capable of appropriately cooling the second refrigerant passing through second rear stage condenser 73L with reduction of the temperature of cascade condenser 8 to an appropriate temperature. Accordingly, control section 92 generates second control signal CS2L indicating a frequency corresponding to target rotation speed B0 to start second compressor 71L. Target rotation speed B0 designated herein is such an appropriate value at which the internal temperature can reach the target temperature as rapidly as possible. When second control signal CS2L is supplied to second power supply section 712L, second motor 711L (i.e., second compressor 71L) starts (step S006).

Meanwhile, present refrigeration apparatus 1 includes keyboard 36a through which target value SV of the internal temperature is set. In response to an operation of keyboard 36a by the user, control section 92 acquires target value SV of the internal temperature set by the user from keyboard 36a, and writes the acquired target value SV to a storage area reserved in non-volatile memory 91 or others in parallel with the processes shown in FIGS. 7A and 7B.

Subsequently to step S006, control section 92 acquires target value SV of the internal temperature from non-volatile memory 91 or others, and acquires detection value PV of the internal temperature from first temperature sensor Se1. Thereafter, control section 92 adds a predetermined temperature to target value SV of the internal temperature to obtain first reference value Vref1 as an example of a temperature reference value (step S007 in FIG. 7B). The predetermined temperature in step S007 is a positive value of approximately +4° C., for example.

Subsequently, control section 92 determines whether or not detection value PV of the internal temperature is lower than or equal to first reference value Vref1 obtained in step S007 (step S008). When determination is YES in this step, control section 92 performs feedback control based on target value SV and detection value PV of the internal temperature. More specifically, control section 92 initially obtains deviation e between detection value PV and target value SV of the internal temperature (step S009). Subsequently, control section 92 performs PI control (proportional-integral control) which brings deviation e close to zero to calculate target rotation speed B of second compressor 71L. However, maximum rotation speed Bmax has been set for second motor 711L, wherefore an upper limit of target rotation speed B is set to maximum rotation speed Bmax (step S010).

Note that target rotation speed B is calculated by PI control in a preferable mode according to the present embodiment. Target rotation speed B is thus calculated for following reasons. When only proportional control (P control) is performed, deviation e may remain for a long period depending on the outside air temperature. For eliminating remaining deviation e within a short period, PI control, which performs integral control (I control) using an integrated value of deviation e as well as P control, is executed.

In case of the foregoing PI control which uses an integrated value, there also arise problems such as a necessity of a time for adjusting detection value PV of the internal temperature to target value SV. For solving these problems, control section 92 preferably executes proportional-integral-derivative control (PID control) which performs derivative control (D control) using a change with time of deviation e as well as the PI control.

Meanwhile, as described in column 1-2 (see FIG. 2), with heat quantity Q1 given to the feedback system as disturbance, heat quantity Q2 (=Q1+W1) is generated at cascade condenser 8, while heat quantity Q3 (=Q1+W1+W2) is generated at both condensers 62H and 63H of first cooling section 6H. Each of heat quantities Q2 and Q3 is determined by heat quantity Q1. Accordingly, once target rotation speed B of second compressor 71L is determined based on heat quantity Q1 (i.e., deviation e) generated by disturbance, target rotation speed A at which first compressor 61H is operated to return the internal temperature to target value SV can be obtained beforehand based on determined target rotation speed B through experiments or the like carried out in a design development stage of present refrigeration apparatus 1. Experiments and investigations conducted by the present inventor have revealed that target rotation speeds A and B exhibit a predetermined correspondence relation with each other. More specifically, it has been clarified that there is a positive correlation between target rotation speeds A and B (i.e., such relation that one increases as the other increases). The present inventor has found that first cooling section 6H and second cooling section 7L operate most efficiently when target rotation speed A is a value of target rotation speed B multiplied by predetermined coefficient k (k: value ranging from 0.25 to 4.00 (inclusive)) (i.e., when target rotation speed A is proportional to target rotation speed B) in a specific embodiment.

Considering the above point, control section 92 multiplies target rotation speed B determined in step S010 by predetermined coefficient k after completion of step S010 to calculate target rotation speed A proportional to target rotation speed B (step S011).

Subsequently, control section 92 determines whether or not target rotation speed A calculated in step S011 exceeds maximum rotation speed Amax of first motor 611H (step S012). When determination is YES in this step, control section 92 sets target rotation speed A to maximum rotation speed Amax (step S013).

After step S013 or when determination is NO in step S012, control section 92 determines whether or not either one of target rotation speeds A and B obtained in step S013 or earlier is lower than minimum rotation speeds Amin and Bmin of motors 611H and 711L, respectively (steps S014A and S014B). When determination is YES in either one of steps S014A and S014B, one of motors 611H and 711L does not appropriately operates. In this case, control section 92 generates first control signal CS1H and second control signal CS2L to temporarily stop both motors 611H and 711L in consideration that the internal temperature is difficult to return to target value SV. When control signals CS1H and CS2L are supplied to power supply sections 612H and 712L, motors 611H and 711L stop (step S015).

Subsequently, control section 92 acquires detection value PV of the internal temperature from first temperature sensor Se1 (step S016 in FIG. 7A), and then determines whether or not detection value PV of the internal temperature acquired in step S016 exceeds target value SV (step S017). Steps S016 and S017 are repeated until determination of YES in step S017. When determination is YES in step S017, control section 92 starts first motor 611H to operate first motor 611H at target rotation speed A0 by a method similar to the method in step S002 (step S018). Thereafter, control section 92 again executes step S004.

Figure 7B:
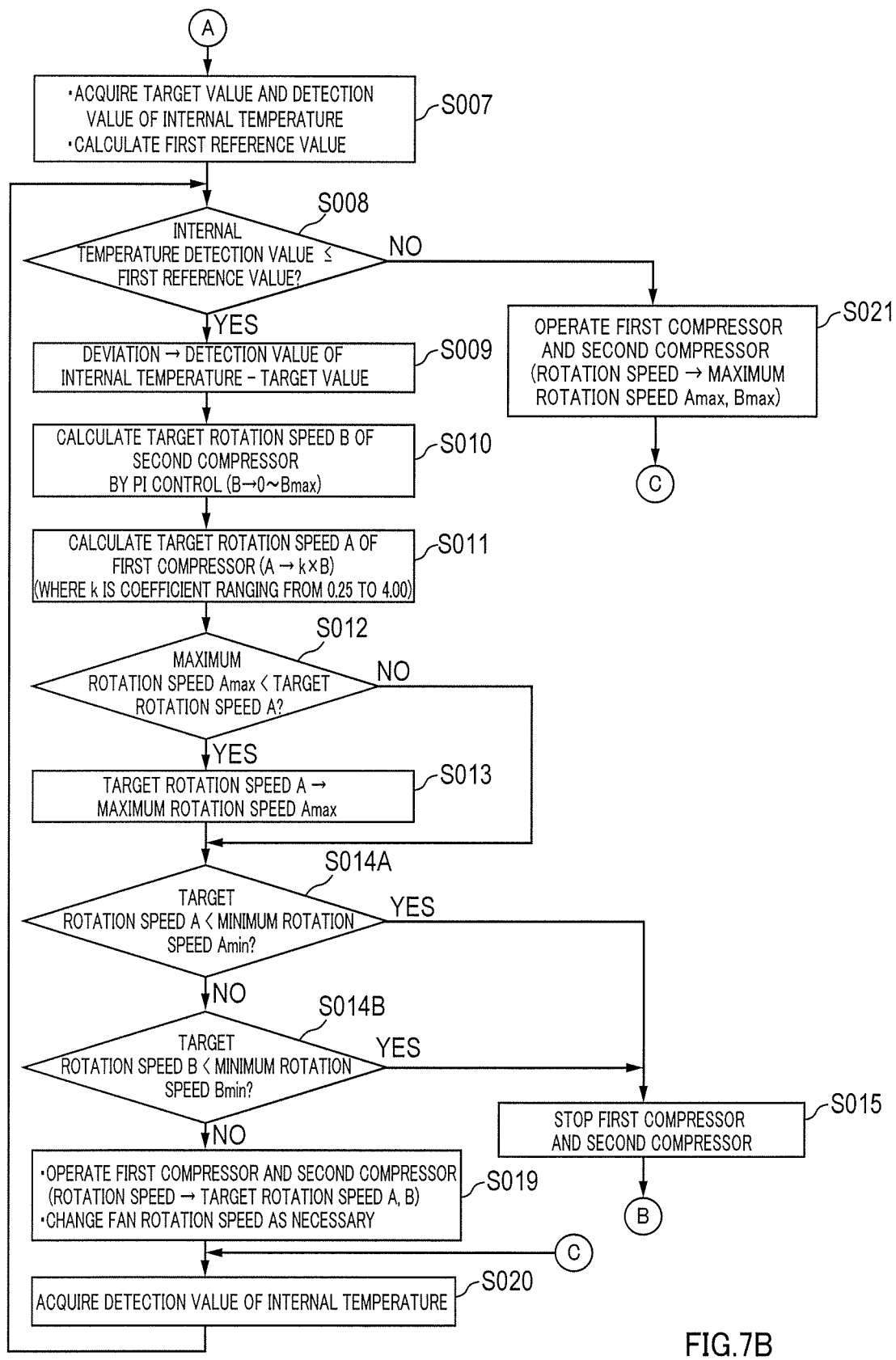
FIG. 7B is a flowchart showing a remaining part of the internal temperature control (Example 1) of the present refrigeration apparatus.

Again refer to steps S014A and S014B in FIG. 7B. When determination is NO in both the steps, control section 92 generates first control signal CS1H and second control signal CS2L for operating motors 611H and 711L at target rotation speeds A and B, respectively. When control signals CS1H and CS2L are supplied to power supply sections 612H and 712L, motors 611H and 711L soon come to operate at target rotation speeds A and B (step S019). In addition, control section 92 preferably changes a rotation speed of motor 68H for fan 67H in accordance with target rotation speed A or target rotation speed B in this step. For example, when target rotation speed A is lower than 2500 min$^{-1}$, the rotation speed of motor 68H is relatively lowered. When target rotation speed A is higher than or equal to 3000 min$^{-1}$, the rotation speed of motor 68H is relatively raised. In this case, efficient cooling is achievable for the first refrigerant passing through the insides of both condensers 62H and 63H. Thereafter, control section 92 executes step S020.

Subsequently, control section 92 acquires detection value PV of the internal temperature from first temperature sensor Se1 and updates acquired detection value PV (step S020), and then again executes step S008.

On the other hand, when determination is NO in step S008, control section 92 generates first control signal CS1H and second control signal CS2L for operating first motor 611H and second motor 711L at maximum rotation speeds Amax and Bmax, respectively, based on a state that deviation e between detection value PV and target value SV of the internal temperature is still large. When first control signal CS1H and second control signal CS2L thus generated are supplied to first power supply section 612H and second power supply section 712L, respectively, first motor 611H and second motor 711L soon come to operate at maximum rotation speeds Amax and Bmax (step S021). Thereafter, control section 92 again executes step S008 after completion of step S020.

2-6. Operation and Effect of Internal Temperature Control (Example 1)

According to the present internal temperature control (Example 1) described above, control section 92 operates compressors 61H and 71L at maximum rotation speeds Amax and Bmax, respectively, while detection value PV of the internal temperature exceeds first reference value Vref1 (i.e., while determination is NO in step S008) (step S021 in FIG. 7B). Accordingly, even when the temperature inside storage space S is raised in response to opening of inner door 24 or for other reasons, the internal temperature can rapidly reach a temperature slightly higher than target value SV of the internal temperature (first reference value Vref1) (see period from time t14 to time t2 in FIG. 8).

In addition, after detection value PV of the internal temperature reaches first reference value Vref1, control section 92 determines target rotation speeds A and B (steps S010 and S011 in FIG. 7B). In principle (basically), compressors 61H and 71L are operated at target rotation speeds A and B, respectively (step S019). At this time, target rotation speed B is determined by PI control based on deviation e between detection value PV and target value SV of the internal temperature, while target rotation speed A is set to a value corresponding to target rotation speed B determined by PI control. According to the present embodiment, target rotation speed A is calculated by multiplying target rotation speed B by predetermined coefficient k.

By elimination of deviation e under the internal temperature control described above, the internal temperature returns to target value SV. According to the internal temperature control performed as above, target rotation speeds A and B are determined by the single feedback system as illustrated in FIG. 9 after detection value PV of the internal temperature reaches first reference value Vref1. Particularly, target rotation speed A is determined based on target rotation speed B calculated by PI control regardless of the temperature of cascade condenser 8. In this case, first compressor 61H is operated without effects such as heat transmission delay and interference described in column 1-2. Detection value PV of the internal temperature therefore is not excessively reduced to a temperature lower than target value SV (see time t2 and later in FIG. 8). Accordingly, efficient operations of compressors 61H and 71L are achievable without producing a waste of energy by present refrigeration apparatus 1.

In addition to the above description, before detection value PV of the internal temperature reaches first reference value Vref1 (see period from t1 to t2 in FIG. 8), the rotation speeds of compressors 61H and 71L are set to maximum rotation speeds Amax and Bmax. After detection value PV reaches first reference value Vref1 (see time t2 and later in FIG. 8), the rotation speeds of compressors 61H and 71L are changed to target rotation speeds A and B determined by the single feedback system. In this case, both compressors 6H and 7L are operated without effects such as heat transmission delay and interference as described in column 1-2. Accordingly, refrigeration apparatus 1 provided herein is capable of rapidly returning the temperature inside storage space S to target value SV even at the time of a rise of the temperature of storage space S.

2-7. (Other) Operation and Effect of Internal Temperature Control (Example 1)

Moreover, according to the present internal temperature control, only first cooling section 6H is operated immediately after power activation. Accordingly, high-load operation of second cooling section 7L is avoidable.

2-8. Note to Internal Temperature Control (Example 1)

According to the description of the internal temperature control (Example 1), target rotation speed A is obtained by multiplying target rotation speed B by coefficient k. However, in a mode where non-volatile memory 91 stores beforehand a table which describes a correspondence relation between target rotation speeds A and B (positive correlation) (i.e., appropriate target rotation speed A for each target rotation speed B), control section 92 may read target rotation speed A corresponding to target rotation speed B obtained in step S010 from the table, and designate read target rotation speed A as target rotation speed A to be set in step S011.

Note that the description in column 2-8 is applicable to internal temperature control (Example 2 to Example 5) described below.

2-9. Internal Temperature Control (Example 2)

Figure 10A:
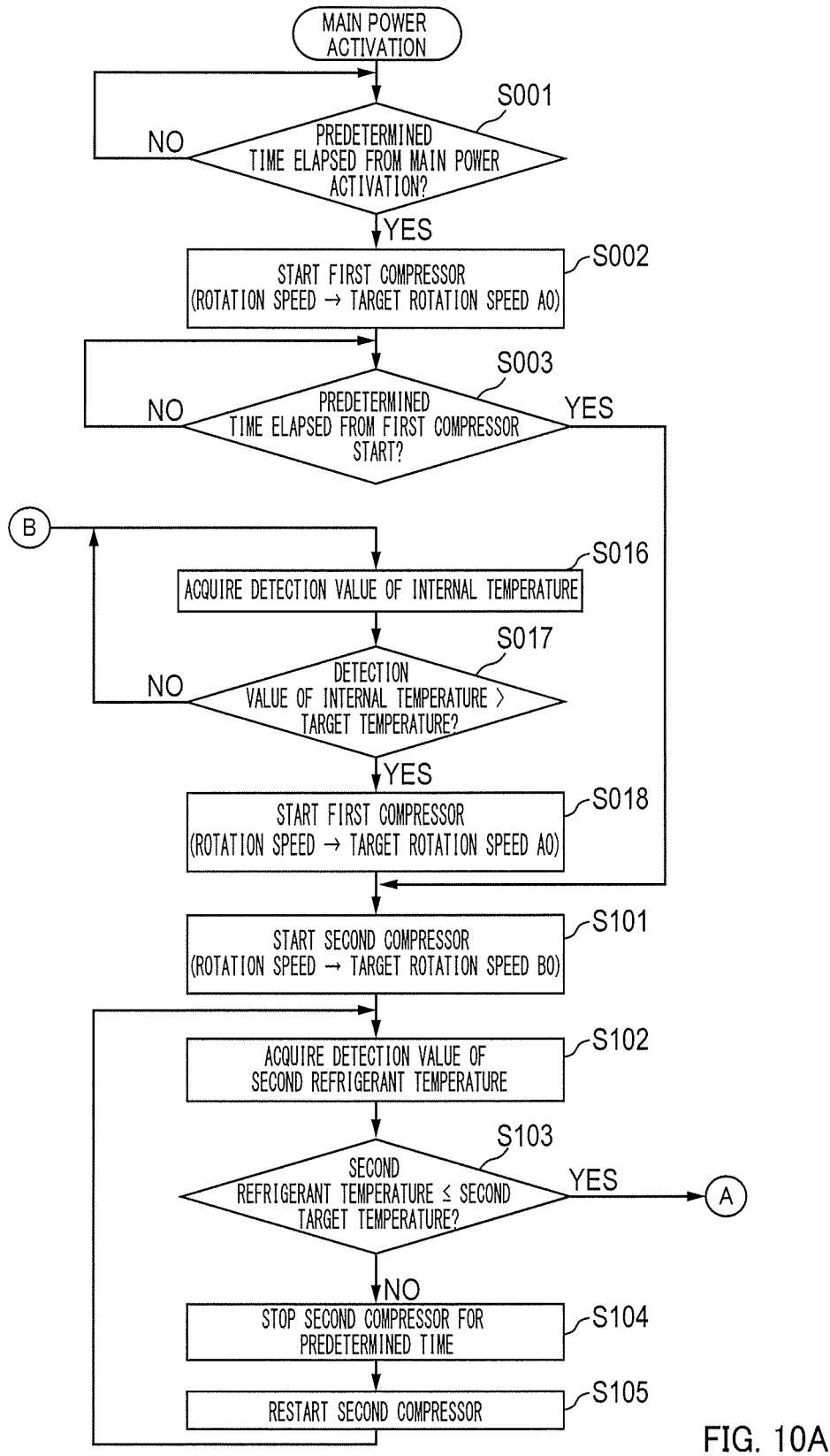
FIG. 10A is a flowchart showing a part of internal temperature control (Example 2) of the present refrigeration apparatus.
Figure 10B:
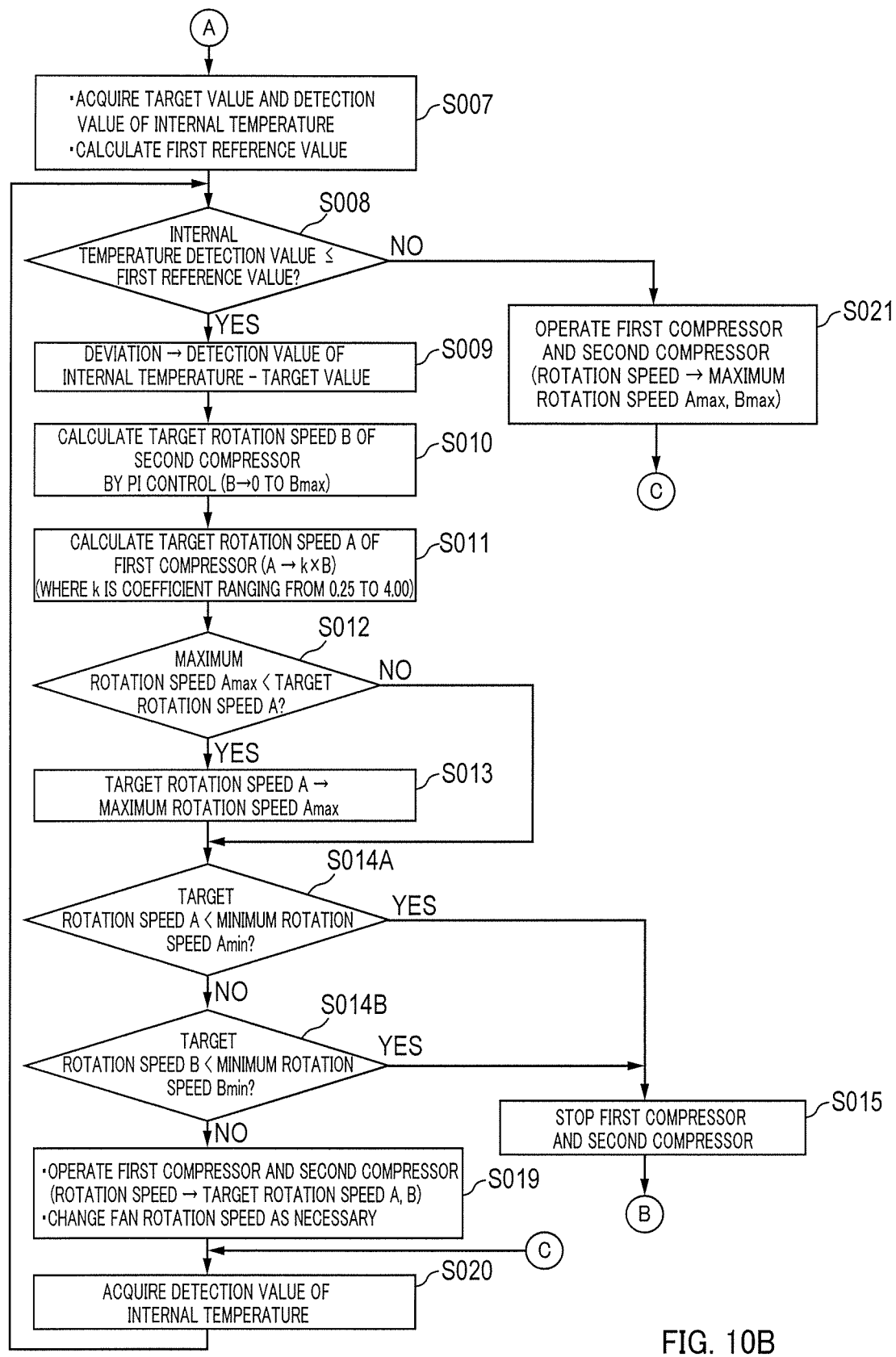
FIG. 10B is a flowchart showing a remaining part of the internal temperature control (Example 2) of the present refrigeration apparatus.

Example 2 of the internal temperature control is now described with reference to FIGS. 10A and 10B. Flows in FIGS. 10A and 10B are different from flows in FIGS. 7A and 7B in that steps S101 to S105 are included instead of steps S004 to S006. No further difference is present between both the flowcharts. Accordingly, steps in FIGS. 10A and 10B similar to corresponding steps in FIGS. 7A and 7B are given identical step numbers, and the same detailed description is not repeated herein.

After completion of step S003 in FIG. 10A, control section 92 starts second motor 711L (i.e., second compressor 71L) to rotate second motor 711L at target rotation speed B0 in a manner similar to the manner of step S006 described above (step S101).

Note that a time elapsed for a predetermined length from the start of first compressor 61H (delay time) in step S003 in FIG. 10A, i.e., a time until a start of second compressor 71L in step S101 after the start of first compressor 61H may be determined in accordance with the second refrigerant temperature or an elapsed time from a stop of second compressor 71L.

More specifically, the delay time is reduced in accordance with a detection value acquired by third temperature sensor Se3 as the second refrigerant temperature when the acquired detection value is lower than or equal to −20° C. with an elapsed time shorter than two hours from the stop of second compressor 71L, for example. In a specific example, the delay time is set to one minute.

On the other hand, when the value acquired by third temperature sensor Se3 exceeds −20° C. with an elapsed time exceeding two hours from the stop of second compressor 71L, the delay time is prolonged. In a specific example, the delay time is set to eight minutes.

As described above, when the second refrigerant temperature is a temperature lower than a predetermined value, or when an elapsed time from the stop of second compressor 71L is not longer than a predetermined time, the time until the start of second compressor 71L is reduced in step S101.

In this case, the time until the start of second compressor 71L from the start of first compressor 61H does not become excessively long in the state that the second refrigerant temperature is lower than the predetermined value, and that a long time is not elapsed yet after the stop of second compressor 71L. Accordingly, the internal temperature control is more efficiently achievable.

Subsequently, control section 92 acquires a detection value of the second refrigerant temperature from third temperature sensor Se3 (step S102), and determines whether or not the acquired detection value of the second refrigerant temperature is lower than or equal to a second target temperature determined beforehand (step S103). When determination is YES in this step, control section 92 executes step S007 and following steps (described above) in FIG. 10B.

On the other hand, when determination is NO in step S103, control section 92 stops operation of second compressor 71L for a fixed period to stop high-load operation of second cooling section 7L, and then restarts second compressor 71L (steps S104 and S105). Thereafter, control section 92 again executes step S102 to recheck the second refrigerant temperature.

2-10. Operation and Effect of Internal Temperature Control (Example 2)

According to the internal temperature control (Example 2) described above, the rotation speeds of both compressors 61H and 71L are controlled similarly to the internal temperature control (Example 1). Accordingly, operation and effect similar to those described in column 2-6 are offered. Moreover, high-load operation of second cooling section 7L immediately after power activation is avoidable by steps S101 to S105. A heat quantity generated by opening of heat insulation door 3 or inner door 24 during operation of present refrigeration apparatus 1, or by loading of a warm cooling target is sequentially transmitted from second cooling section 7L to first cooling section 6H. In this case, the foregoing heat quantity change status is detectable earlier than a temperature change of the first refrigerant based on detection of the temperature of the second refrigerant, as in the manner of the internal temperature control (Example 2). Accordingly, the internal temperature control is more accurately achievable.

2-11. Note to Internal Temperature Control (Example 2)

According to the above description of the internal temperature control (Example 2), control section 92 stops second compressor 71L for the fixed period, and then restarts second compressor 71L in steps S104 and S105. However, when target rotation speed A0 of first compressor 61H set in step S002 is lower than or equal to maximum rotation speed Amax, control section 92 may set the rotation speed of first compressor 61H to a speed higher than target rotation speed A0 set in step S002, rather than performing steps S104 and S105. In this manner, a high-load state of second cooling section 7L immediately after power activation is avoidable.

In addition, control section 92 may start second compressor 71L in step S101 in FIG. 10A, acquire a detection value of the second refrigerant temperature from third temperature sensor Se3 in step S102, and then stop second compressor 71L in accordance with the second refrigerant temperature after an elapse of a predetermined time from the start of second compressor 71L.

For example, second compressor 71L may be stopped in accordance with a detection value acquired as the second refrigerant temperature by third temperature sensor Se3, such as a value higher than or equal to −10° C., after an elapse of 30 seconds as the predetermined time from the start of second compressor 71L.

In this case, second compressor 71L is not operated in a state that the second refrigerant temperature is higher than the predetermined temperature. Accordingly, a high-load state of second cooling section 7L immediately after power activation is avoidable.

Moreover, the predetermined time from the start of second compressor 71L in this case may be changed in accordance with conditions.

These conditions include such a condition that the second refrigerant temperature higher than a predetermined value is lowering. In this condition, the predetermined time after the start of second compressor 71L is set to a period longer than the corresponding predetermined time in other situations.

More specifically, when the second refrigerant temperature higher than −10° C. is lowering, for example, the predetermined time from the start of second compressor 71L is set to 120 seconds.

In this manner, more efficient internal temperature control is achievable by changing the predetermined time from the start of second compressor 71L to the stop of second compressor 71L in accordance with conditions.

Second compressor 71L is restarted in response to confirmation that a predetermined time (first predetermined time) has elapsed after the stop of the second refrigerant by the foregoing steps, and that the temperature of the second refrigerant is lower than a predetermined value, or in response to an elapse of a maximum predetermined time longer than the foregoing first predetermined time.

More specifically, second compressor 71L is restarted in response to confirmation that a period of four minutes as the first predetermined time has elapsed after the stop of the second refrigerant, and that the temperature of the second refrigerant is lower than or equal to −34° C., or in response to an elapse of 15 minutes as the maximum predetermined time from the stop of the second refrigerant.

In addition, control section 92 may temporarily raise the number of rotations of first compressor 61H in accordance with the outside temperature only for a predetermined time after an elapse of a predetermined time from the start of second compressor 71L in step S101. For example, when an ambient temperature detected by second temperature sensor Se2 is higher than or equal to 32° C., the rotation speed of first compressor 61H is raised from 3600 rpm (one example of target rotation speed A0) to 4000 rpm. In other words, the number of rotations of first compressor 61H is temporarily raised to a speed higher than target rotation speed A0 when the outside temperature is higher than a predetermined value.

More specifically, the number of rotations of first compressor 61H is raised after an elapse of 20 seconds, for example, from the start of second compressor 71L in step S101. Thereafter, the rotation speed of first compressor 61H is returned to target rotation speed A0 when the second refrigerant temperature has become lower than or equal to a predetermined value with detection of a high-temperature peek value of the second refrigerant temperature after operation of first compressor 61H having the raised number of rotations. For example, the rotation speed of first compressor 61H is returned to target rotation speed A0 when the second refrigerant temperature becomes lower than or equal to −30° C.

More specifically, when the outside temperature is higher than a predetermined value, the number of rotations of first compressor 61H is temporarily raised after an elapse of a predetermined time from the start of second compressor 71L. First compressor 61H is operated in the state of the raised number of rotations, whereafter the rotation speed of first compressor 61H is returned to target rotation speed A0 in accordance with the second refrigerant temperature.

In this manner, performance of first cooling section 6H increases by the rise of the rotation speed of first compressor 61H in a state of the excessively high outside temperature. Accordingly, a high-load state of second cooling section 7L immediately after power activation is avoidable.

2-12. Internal Temperature Control (Example 3)

Example 3 of the internal temperature control is now described with reference to FIGS. 11A and 11B.

Figure 11A:
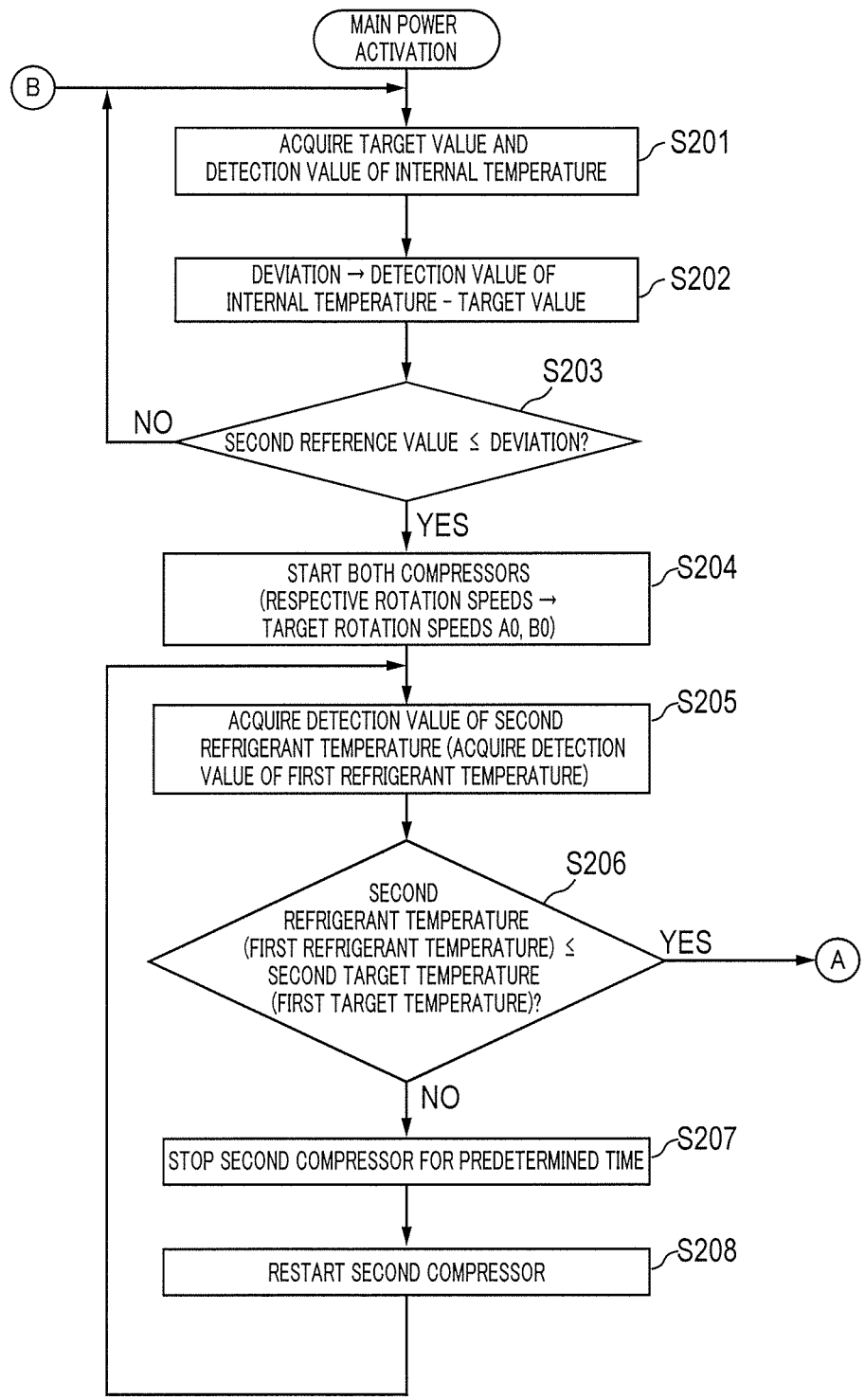
FIG. 11A is a flowchart showing a part of internal temperature control (Example 3) of the present refrigeration apparatus.

After power activation, control section 92 initially acquires target value SV of the internal temperature from non-volatile memory 91 or others, and also acquires detection value PV of the internal temperature from first temperature sensor Se1 (see step S201 in FIG. 11A). Subsequently, control section 92 obtains deviation e between detection value PV and target value SV of the internal temperature thus acquired, and stores deviation e in SRAM 93 or others (step S202).

Thereafter, control section 92 determines whether or not current deviation e is larger than or equal to second reference value Vref2 determined beforehand (step S203). Second reference value Vref2, as an example of a second deviation reference value, corresponds to a reference temperature for starting both compressors 61H and 71L, and is set to approximately 50° C., for example. When determination is NO in this step, control section 92 again executes step S201.

On the other hand, when determination is YES in step S203, control section 92 generates control signals CS1H and CS2L for operating motors 611H and 711L (i.e., compressors 61H and 71L) at target rotation speeds A0 and B0, respectively, and supplies generated control signals CS1H and CS2L to power supply sections 612H and 712L, respectively. In this manner, control section 92 simultaneously starts both motors 611H and 711L (step S204). Target rotation speeds A0 and B0 at this time are set to appropriate speeds at which cascade condenser 8 and others can reach an appropriate temperature as rapidly as possible.

Subsequently, control section 92 acquires a detection value of the second refrigerant temperature from third temperature sensor Se3 (step S205), and determines whether or not the acquired detection value of the second refrigerant temperature is lower than or equal to a second target temperature determined beforehand (step S206).

When determination is NO in step S206, control section 92 stops second compressor 71L for a predetermined time in consideration that second cooling section 7L is in a high-load state, and then restarts second compressor 71L (steps S207 and S208). Thereafter, control section 92 again executes step S205 to recheck the second refrigerant temperature.

Figure 11B:
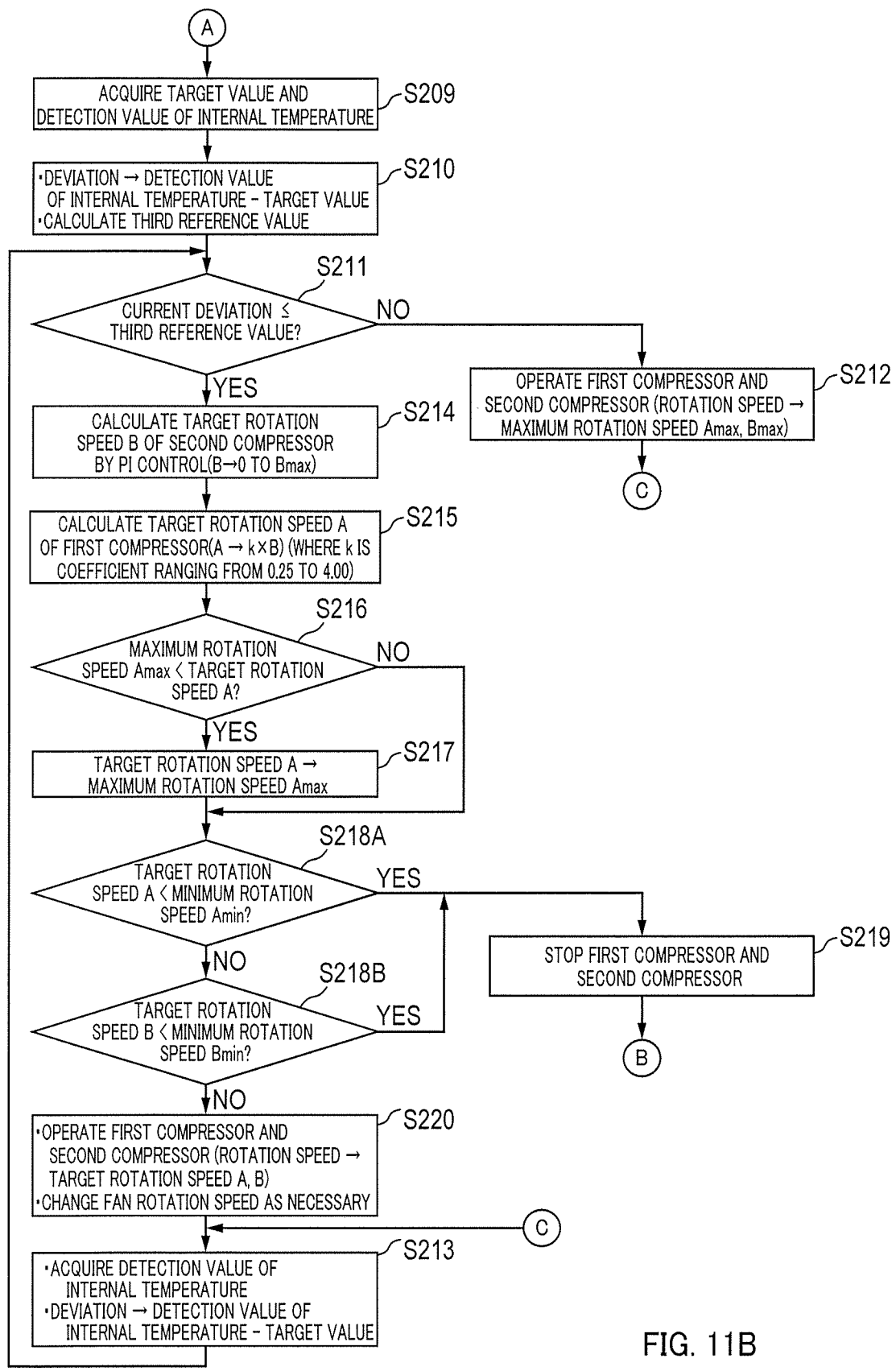
FIG. 11B is a flowchart showing a remaining part of the internal temperature control (Example 3) of the present refrigeration apparatus.

On the other hand, when determination is YES in step S206, control section 92 acquires detection value PV of the internal temperature from first temperature sensor Se1, and also acquires target value SV stored in non-volatile memory 91 or others (step S209 in FIG. 11B). Subsequently, control section 92 obtains deviation e between detection value PV and target value SV acquired in step S209, and then adds a predetermined temperature to deviation e to obtain third reference value Vref3 as an example of a first deviation reference value (step S210). The predetermined temperature in step S210 is a positive value of approximately +4° C., for example.

Subsequently, control section 92 determines whether or not current deviation e is lower than or equal to third reference value Vref3 obtained in step S210 (step S211).

When determination is NO in step S211, control section 92 operates first motor 611H and second motor 711L at maximum rotation speeds Amax and Bmax, respectively, in a manner similar to the manner of step S021 described above (step 3212).

Subsequently, control section 92 acquires detection value PV of the internal temperature from first temperature sensor Se1, obtains and updates deviation e based on acquired detection value PV and target value SV (step S213), and then again executes step S211.

On the other hand, when determination is YES in step S211, control section 92 calculates target rotation speed B of second compressor 71L in a manner similar to the manners of steps S010 and S011 described above, and then calculates target rotation speed A having a correspondence relation with target rotation speed B (steps S214 and S215).

Subsequently, control section 92 sets target rotation speed A to maximum rotation speed Amax when calculated target rotation speed A exceeds maximum rotation speed Amax in a manner similar to the manner of steps S012 and S013 described above (steps S216 and S217). When determination is NO in step S216 or after step S217, control section 92 determines whether or not obtained target rotation speed A is lower than minimum rotation speed Amin, and whether or not obtained target rotation speed B is lower than minimum rotation speed Bin, in a manner similar to the manner of steps S014A and S014B after completion of step S217 (steps S218A and S218B). When determination is YES in either one of steps S218A and S218B, motors 611H and 711L are stopped in a manner similar to the manner of step S015 (step S219). Thereafter, control section 92 again executes step S201 in FIG. 11A.

On the other hand, when determination is NO in steps S218A and S218B in FIG. 11B, control section 92 operates motors 611H and 711L at target rotation speeds A and B, respectively, in a manner similar to the manner of step S019 described above (step S220). In addition, control section 92 in this step preferably changes a rotation speed of motor 68H for fan 67H in accordance with target rotation speed A in a manner similar to the manner of step S019 described above. Thereafter, control section 92 again executes step S213.

2-13. Specific Example of Internal Temperature Control (Example 3)

Figure 12:
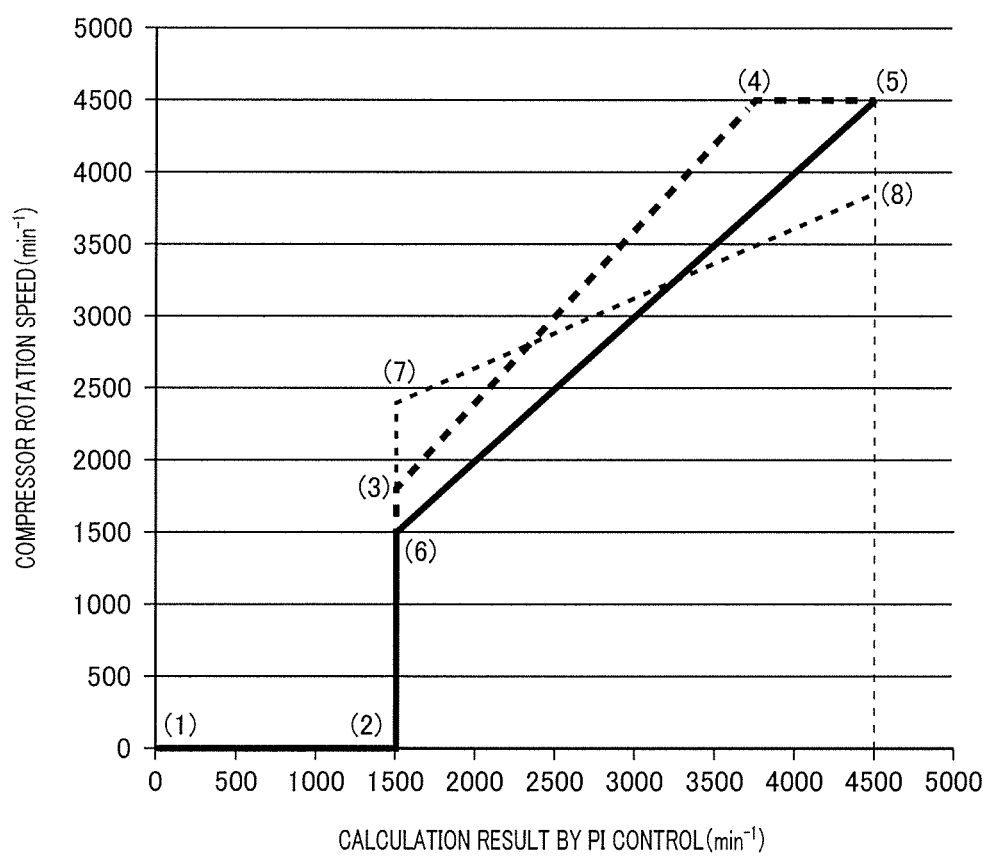
FIG. 12 is a chart showing an example of changes of rotation speeds of a first compressor and a second compressor during execution of the internal temperature control (Example 3)

Described now with reference to FIG. 12 is an example of changes of rotation speeds of first compressor 61H and second compressor 71L produced when the internal temperature control (Example 3) described above are executed under predetermined conditions.

Suppose that detection value PV of the internal temperature is 20° C., and that target value SV is −80° C. when power is activated for storage space S not cooled at all. Deviation e at this time is 100° C.

In addition, assuming that second reference value Vref2 is 5° C., it is determined that current deviation e (100° C.) is higher than or equal to second reference value Vref2 in step S203. In this case, compressors 61H and 71L are started to operate at target rotation speeds A0 and B0, respectively, in step S204. As a result, the first refrigerant and the second refrigerant start circulating within first fluid circuit 66H and second fluid circuit 76L.

When it is determined in step S206 that the second refrigerant temperature is higher than the second target temperature, second compressor 71L is stopped for a predetermined time and restarted in steps S207 and S208 as described above. Alternatively, second compressor 71L may be operated at a low rotation speed for the predetermined time.

Figure 8:
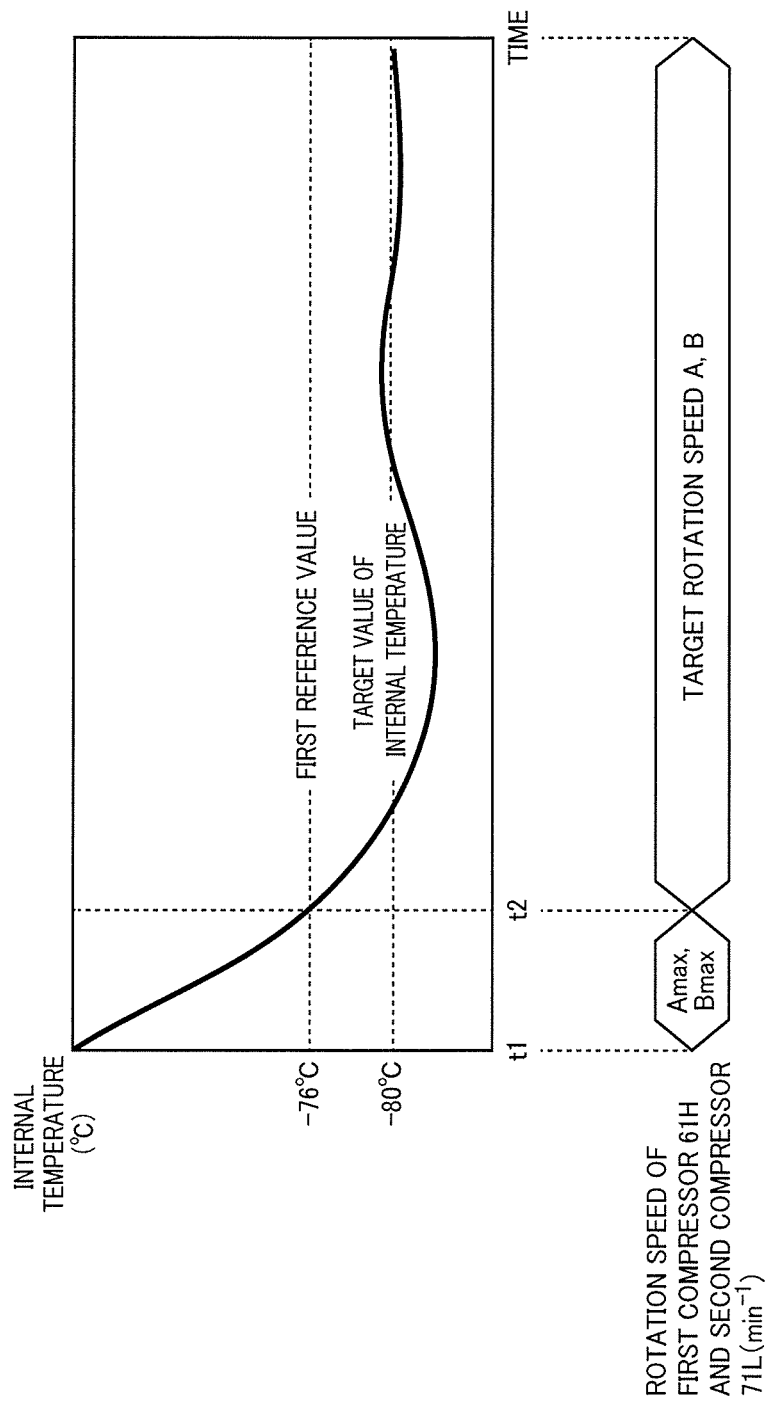
FIG. 8 is a graph showing a change with time of an internal temperature of the present refrigeration apparatus, and a chart showing transitions of rotation speeds of a first compressor and a second compressor.
Figure 9:
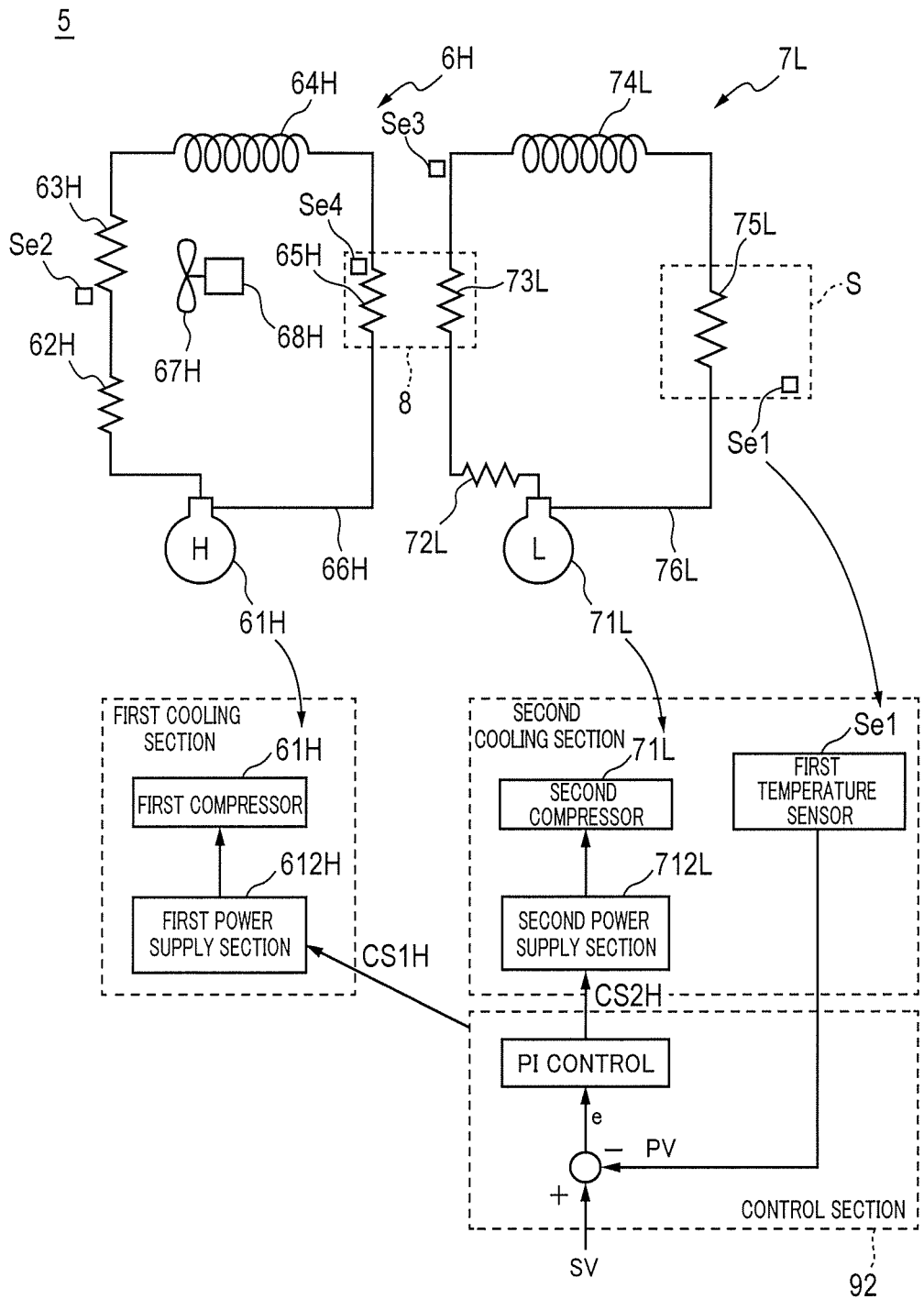
FIG. 9 is a diagram illustrating a relationship between the cooling section and a block configuration of the control system included in the present refrigeration apparatus.

When it is determined in step S206 that the second refrigerant temperature is lower than or equal to the second target temperature, compressors 61H and 71L are operated at maximum rotation speeds Amax and Bmax, respectively, until determination becomes YES in step S211 as indicated from time t1 to time t2 in FIG. 8. When determination is YES in step S211, target rotation speed B of second compressor 71L is calculated by PI control shown in step S214 and following steps. Besides, target rotation speed A is calculated by multiplying target rotation speed B by coefficient k.

When it is determined that calculated target rotation speed A exceeds maximum rotation speed Amax, target rotation speed A is limited within maximum rotation speed Amax (e.g., 4500 min$^{-1}$) by processing in steps S216 and S217 as indicated by broken line segments connecting (4) and (5) in FIG. 12.

When either one of calculated target rotation speeds A and B is lower than minimum rotation speeds Amin and Bmin (e.g., 1500 min$^{-1}$), respectively, refrigeration apparatus 1 does not appropriately operate by operations of compressors 61H and 71L at speeds lower than minimum rotation speeds Amin and Bmin. Accordingly, both compressors 61H and 71L are stopped at any calculated value of rotation speed B under PI control by processing in steps S218A, S218B, and S219 as indicated by a solid line segment connecting (1) and (2) in FIG. 12.

When calculated target rotation speeds A and B are higher than or equal to minimum rotation speeds Amin and Bmin, respectively, first compressor 61H is operated at target rotation speed A (=k×B) as indicated by a broken line segment connecting (3) and (4) in FIG. 12. In addition, second compressor 71L is operated at target rotation speed B as indicated by a solid straight line connecting (6) and (5) in FIG. 12. Note that FIG. 12 shows an example when k is 1.2.

Detection value PV of the internal temperature becomes substantially equivalent to target value SV by cyclically repeating the foregoing processing in steps S214 to S218B, S220, and S213 (see time t2 and later in FIG. 8).

2-14. Operation and Effect of Internal Temperature Control (Example 3)

According to the internal temperature control (Example 3) described above, the rotation speeds of both compressors 61H and 71L are controlled similarly to the internal temperature control (Example 1). Accordingly, operation and effect similar to those described in column 2-6 are offered. Moreover, high-load operation of second cooling section 7L immediately after power activation is avoidable by steps S205 to S208.

2-15. Note to Internal Temperature Control (Example 3)

In the above description, a detection value of the second refrigerant temperature is acquired from third temperature sensor Se3, and whether or not the acquired second refrigerant temperature is lower than or equal to the second target temperature is determined in steps S205 and S206 in FIG. 11A. However, a detection value of the first refrigerant temperature may be acquired from fourth temperature sensor Se4, and whether or not the acquired first refrigerant temperature is lower than or equal to the first target temperature may be determined as shown in parentheses in steps S205 and S206 in FIG. 11A. In this manner, whether or not second cooling section 7L is in a high-load operation can be similarly determined.

In addition, according to the above description, both compressors 61H and 71L are stopped in step S219 in FIG. 11B. However, only second compressor 71L may be stopped, while first compressor 61H may be operated at minimum rotation speed Amin. In other words, first compressor 61H may be only required to operate at a speed lower than a previous speed.

Moreover, according to the above description, target rotation speed A is calculated by multiplying target rotation speed B by coefficient k in step S215 in FIG. 11B. Alternatively, target rotation speed A may be calculated by an equation A=k×B+c. In this case, target rotation speed A (A=k×B+c) may be higher or lower than target rotation speed B (indicated by solid line segment connecting (6) and (5)) obtained by calculation of PI control as indicated by a broken line segment connecting (7) and (8) in FIG. 12.

In addition, when present refrigeration apparatus 1 is in a normal condition, the second refrigerant temperature becomes a temperature lower than or equal to the second target temperature after repeating a loop from step S205 to step S208 in FIG. 11A at most several times by control section 92. In this case, the process shifts from step S206 to step S209. Accordingly, by utilizing this feature, control section 92 may display message information indicating abnormality of refrigeration apparatus 1 on display 36*b* when the loop is executed a predetermined number of times or more, in consideration that refrigeration apparatus 1 is in an abnormal state.

Note that the description in present column 2-15 is applicable to the internal temperature control (Example 4 and Example 5) described below, and further to the internal temperature control (Example 1 and Example 2) described above.

2-16. Internal Temperature Control (Example 4)

Example 4 of the internal temperature control is now described with reference to FIGS. 13A and 13B.

Figure 13A:
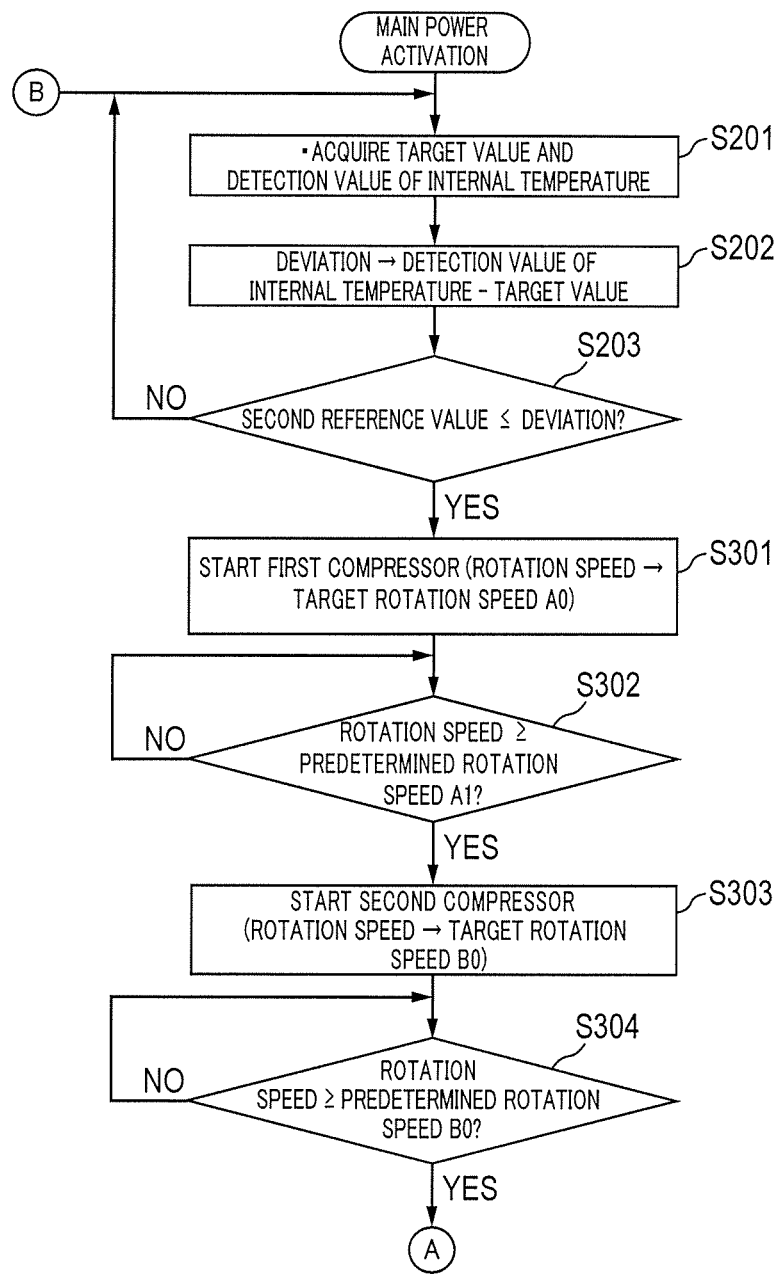
FIG. 13A is a flowchart showing a part of internal temperature control (Example 4) of the present refrigeration apparatus.
Figure 13B:
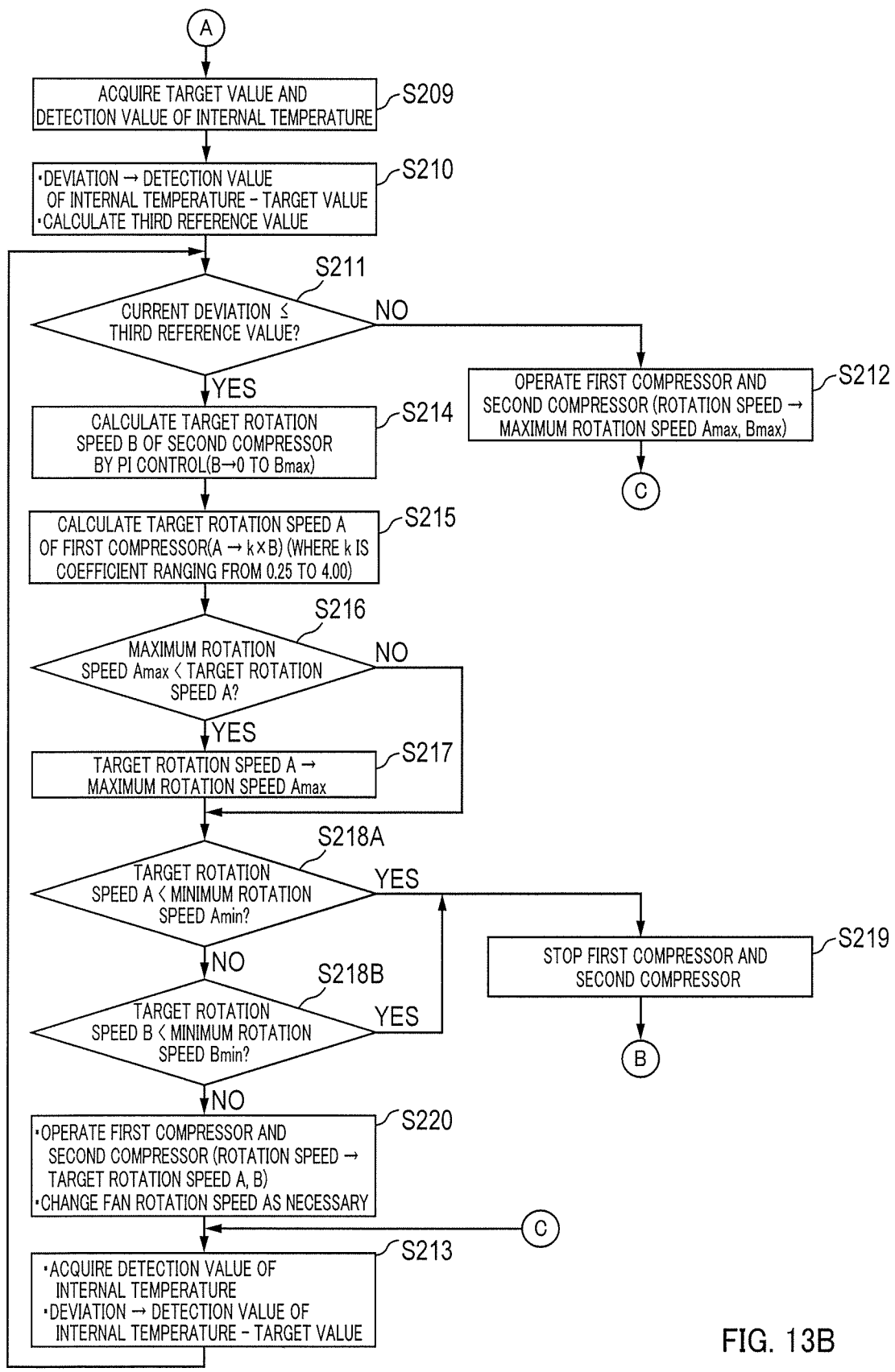
FIG. 13B is a flowchart showing a remaining part of the internal temperature control (Example 4) of the present refrigeration apparatus.

Flows in FIGS. 13A and 13B are different from flows in FIGS. 11A and 11B in that steps S301 to S304 are included instead of steps S204 to S208. No further difference is present between both the flowcharts. Accordingly, steps in FIGS. 13A and 13B similar to corresponding steps in FIGS. 11A and 11B are given identical step numbers, and the same detailed description is not repeated herein.

When determination is YES in step S203, control section 92 generates first control signal CS1H for operating first compressor 61H at target rotation speed A0 determined beforehand, and supplies generated first control signal CS1H to first power supply section 612H. At this time, target rotation speed A0 is set to 4000 min$^{-1}$, for example, to adjust the temperature of cascade condenser 8 to the target temperature as rapidly as possible. In addition, control section 92 generates first control signal CS1H for raising the rotation speed of first motor 611H to target rotation speed A0 based on an acceleration sequence determined beforehand (step S301).

Note that an actual rotation speed of first compressor 61H is preferably detected by first power supply section 612H constituted by an inverter circuit, and output to control section 92 such that control section 92 can output first control signal CS1H with reference to the actual rotation speed. However, control section 92 is not necessarily required to generate first control signal CS1H based on the actual rotation speed, but may adjust the rotation speed of first compressor 61H to target rotation speed A0 in accordance with the predetermined acceleration sequence as long as a rotation abnormal signal or the like of first compressor 61H is not issued.

When the rotation speed of first compressor 61H reaches target rotation speed A1 (A1: numerical value meeting A1≤A0) (i.e., after elapse of predetermined time) (step S302), control section 92 subsequently generates second control signal CS2L for operating second compressor 71L at target rotation speed B0 determined beforehand based on an acceleration sequence determined beforehand, and supplies generated second control signal CS2L to second power supply section 712L. In this case, target rotation speed B0 is set to 2000 min$^{-1}$, for example, to adjust the temperature of cascade condenser 8 to an appropriate temperature as rapidly as possible (step S303).

When the rotation speed of second compressor 71L reaches target rotation speed B0 (i.e., after elapse of predetermined time) (step S304), control section 92 executes step S209 and following steps (described above) in FIG. 13B.

2-17. Operation and Effect of Internal Temperature Control (Example 4)

According to the internal temperature control (Example 4) described above, the rotation speeds of both compressors 61H and 71L are controlled similarly to the internal temperature control (Example 1). Accordingly, operation and effect similar to those described in column 2-6 are offered. Moreover, high-load operation of second cooling section 7L immediately after power activation is avoidable by steps S301 to S304.

2-18. Internal Temperature Control (Example 5)

Example 5 of internal temperature control is now described with reference to FIGS. 14A and 14B.

Figure 14A:
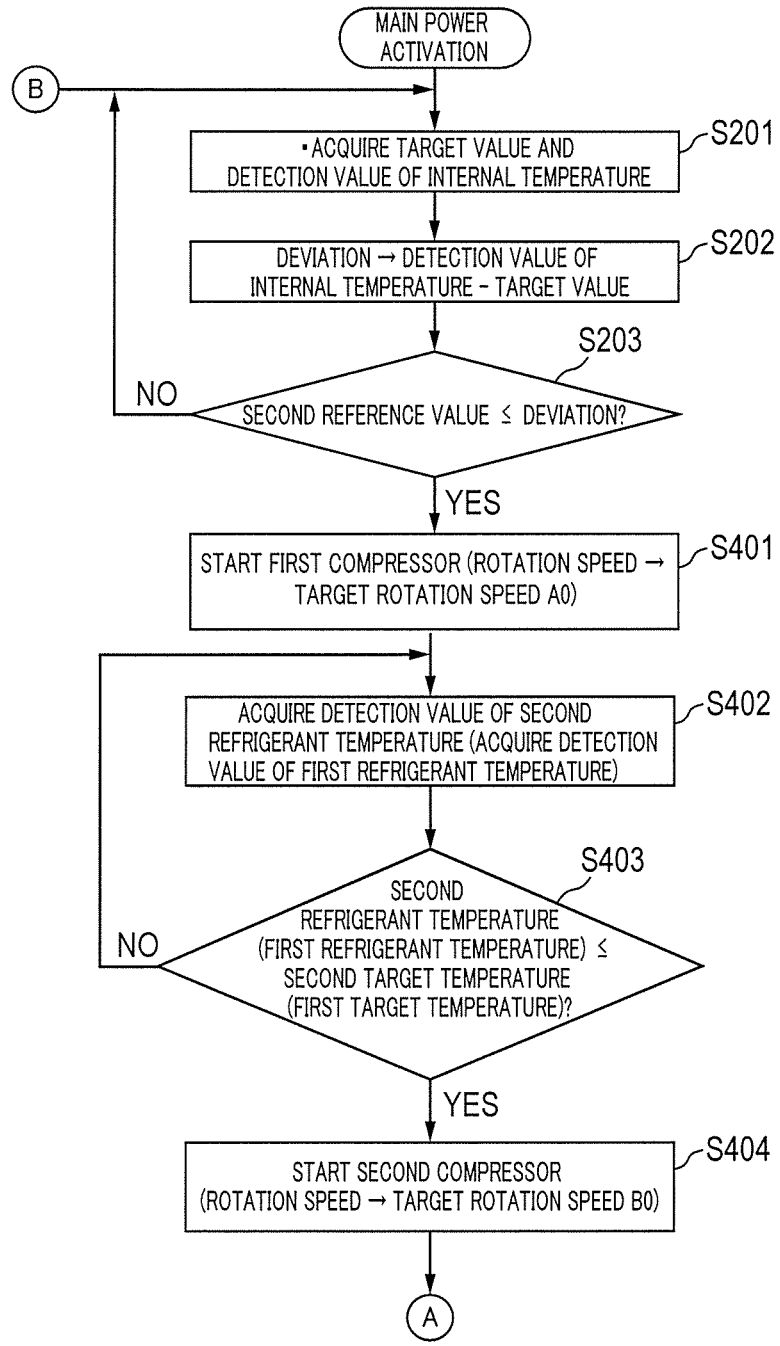
FIG. 14A is a flowchart showing a part of internal temperature control (Example 5) of the present refrigeration apparatus.
Figure 14B:
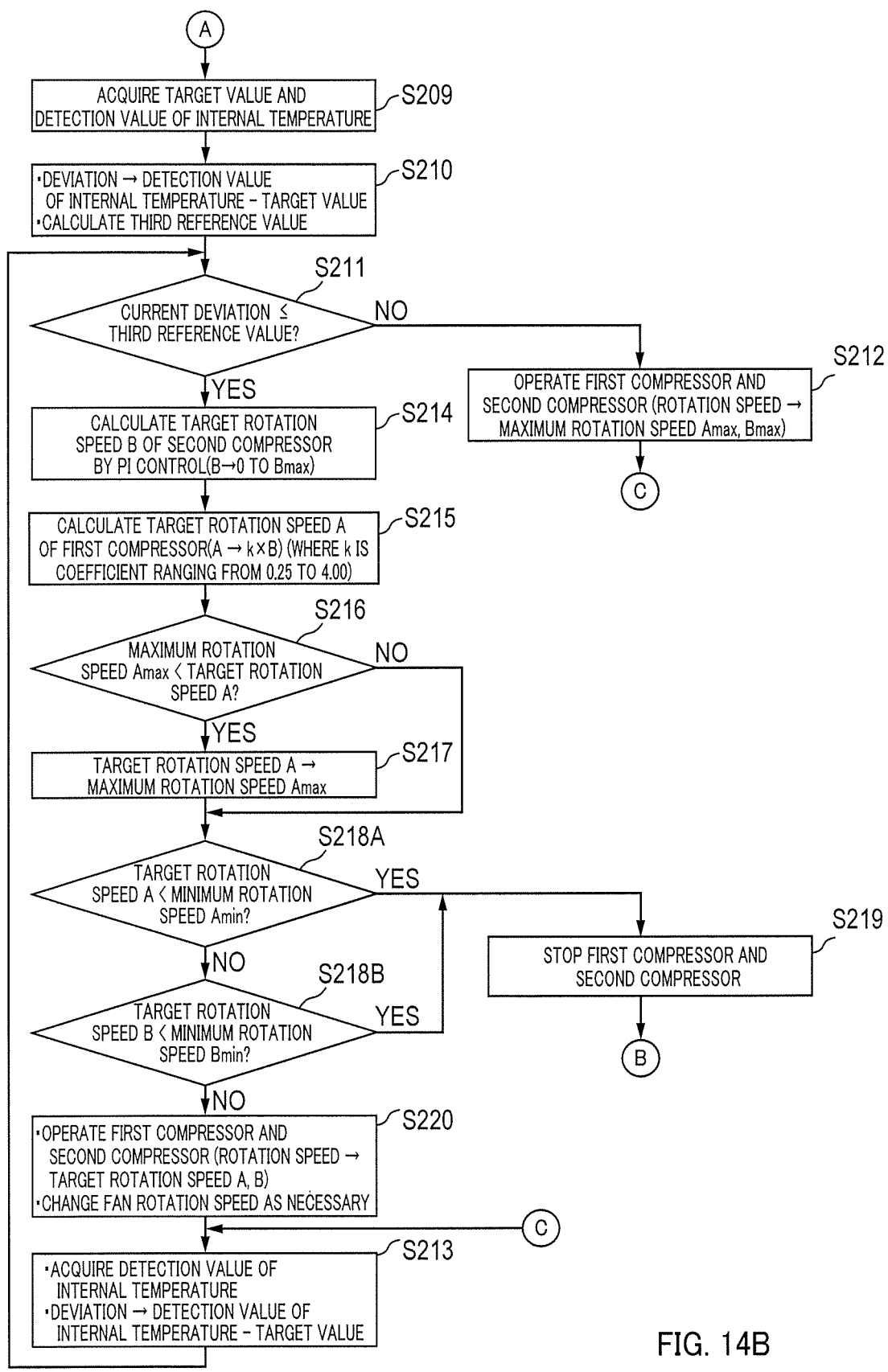
FIG. 14B is a flowchart showing a remaining part of the internal temperature control (Example 5) of the present refrigeration apparatus.

Flows in FIGS. 14A and 14B are different from flows in FIGS. 11A and 11B in that steps S401 to S404 are included instead of steps S204 to S208. No further difference is present between both the flowcharts. Accordingly, steps in FIGS. 14A and 14B similar to corresponding steps in FIGS. 11A and 11B are given identical step numbers, and the same detailed description is not repeated herein.

When determination is YES in step S203, control section 92 starts first compressor 61H to operate first compressor 61H at target rotation speed A0 in a manner similar to the manner of step S301 described above (step S401).

Subsequently, control section 92 acquires a detection value of the second refrigerant temperature from third temperature sensor Se3 (step S402), and determines whether or not the acquired detection value of the second refrigerant temperature is lower than or equal to a second target temperature determined beforehand (step S403). Note that a detection value of the first refrigerant temperature may be acquired from fourth temperature sensor Se4, and whether or not the acquired first refrigerant temperature is lower than or equal to the first target temperature may be determined as shown in parentheses in steps S402 and S403 in FIG. 14A, similarly to the description in column 2-15. When determination is NO in step S403, control section 92 again executes step S402.

On the other hand, when determination is YES in step S403, control section 92 generates second control signal CS2L indicating a frequency corresponding to target rotation speed B0 to start second compressor 71L in consideration that a sufficient condition has been achieved for appropriate cooling of the second refrigerant passing through second rear stage condenser 73L, and supplies generated second control signal CS2L to second power supply section 712L. As a result, second motor 711L (i.e., second compressor 71L) starts (step S404).

Thereafter, control section 92 executes step S209 and following steps (described above) in FIG. 14B.

2-19. Operation and Effect of Internal Temperature Control (Example 5)

Operation and effect described in column 2-6 are similarly offered by the internal temperature control (Example 5) described above. Moreover, high-load operation of second cooling section 7L immediately after power activation is avoidable by steps S401 to S404.

2-20. Determination of Optimum Coefficient k

According to the internal temperature control described above, coefficient k may be a fixed value in a preferable range from 0.25 to 4.00 (inclusive). However, based on extensive investigations repeated by the present inventor, it has clarified that a ratio of target rotation speeds A to B (i.e., k) is preferably varied in accordance with target value SV of the internal temperature and an ambient temperature to minimize total power consumption of both compressors 61H and 71L (hereinafter abbreviated as total power consumption).

Figure 15:
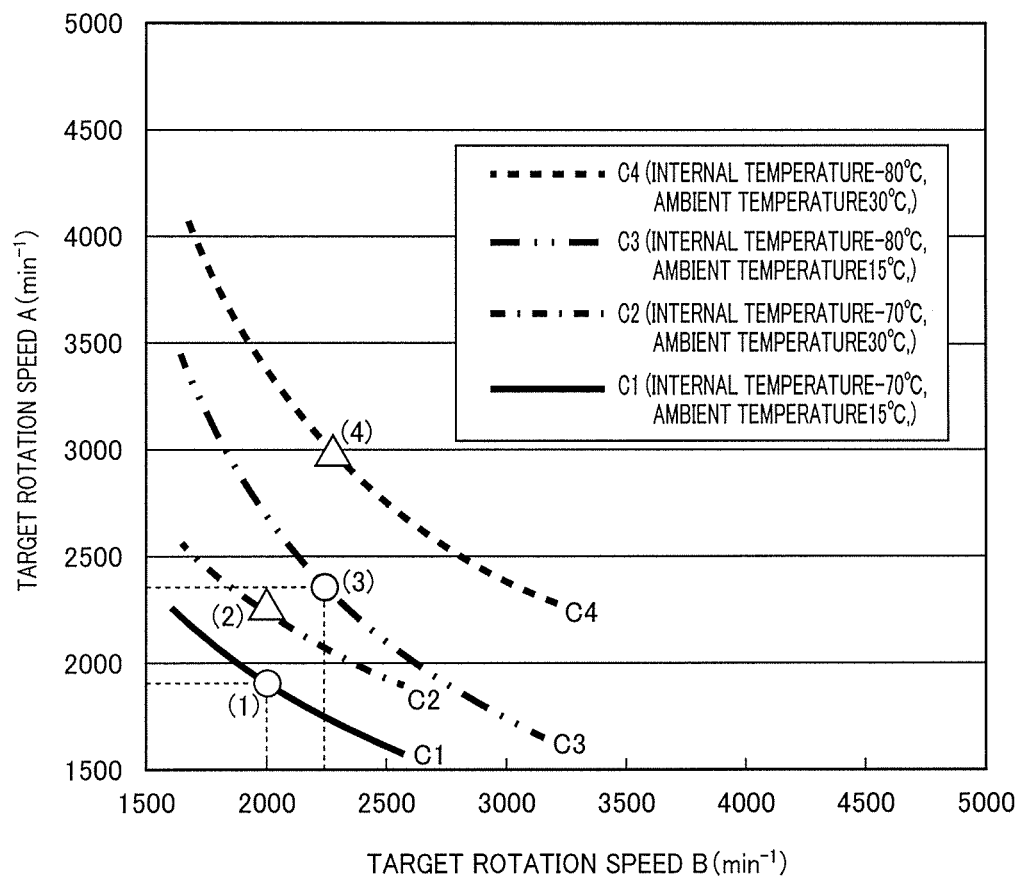
FIG. 15 is a chart showing an optimum coefficient for each combination of an ambient temperature and an internal temperature.

Curve C1 in FIG. 15 represents a correspondence relation between rotation speeds A and B appropriate for obtaining an internal temperature of −70° C. under an ambient temperature condition of 15° C. A point at which the total power consumption becomes the minimum on curve C1 is point (1) (i.e., target rotation speeds A and B are approximately 1900 $min^{-1}$ and 2000 $min^{-1}$).

FIG. 15 also shows curves C2, C3, and C4. Curve C2 represents a correspondence relation between rotation speeds A and B for obtaining an internal temperature of −70° C. at an ambient temperature of 30°. Curves C3 and C4 represent a correspondence relation between rotation speeds A and B for obtaining an internal temperature of −80° C. at ambient temperatures of 15° C. and 30° C., respectively. Points at which the total power consumption becomes the minimum on curves C2, C3, and C4 are points (2), (3), and (4), respectively.

Points (1) to (4) can be obtained by measuring the total power consumption while appropriately changing the ambient temperature and a value of the internal temperature, and changing the rotation speeds of both compressors 61H and 71L in a design development stage of present refrigeration apparatus 1. According to actual measurements thus obtained, target rotation speeds A and B at point (2) were 2300 $min^{-1}$ and 2000 $min^{-1}$, target rotation speeds A and B at point (3) were 2400 $min^{-1}$ and 2250 $min^{-1}$, and target rotation speeds A and B at point (4) were 3000 $min^{-1}$ and 2250 $min^{-1}$, respectively.

Coefficient k is a value A/B, wherefore k is preferably 1900/2000=0.95 for obtaining an internal temperature of −70° C. under an ambient temperature condition of 15° C. Similarly, coefficient k is preferably 2300/2000=1.15 for obtaining an internal temperature of −70° C. under an ambient temperature condition of 30° C. Coefficient k is preferably 2400/2250=1.06 for obtaining an internal temperature of −80° C. under an ambient temperature condition of 15° C. Coefficient k is preferably 3000/2250=1.33 for obtaining an internal temperature of −80° C. under an ambient temperature condition of 30° C.

The present inventor calculated optimum coefficient k for each of several combinations of the ambient temperature and the target value of the internal temperature in the foregoing manner. Results thus obtained are shown in following Table 1. Note that coefficient k for an ambient temperature of 23° C. corresponds to an interpolated value of respective coefficients k for ambient temperatures of 15° C. and 30° C. in following Table 1.

[Table 1]

TABLE 1

Optimum coefficient k for ambient temperature and internal temperature (target value)

| | | Internal temperature (target value) | | |
|---|---|---|---|---|
| | | 70 | 75 | 80 |
| Ambient temperature (° C.) | 15 | 0.95 Point (1) | 1.01 | 1.06 Point (3) |
| | 23 | 1.05 | 1.12 | 1.20 |
| | 30 | 1.15 Point (2) | 1.24 | 1.33 Point (4) |

Control section 92 retains beforehand a table (Table 1 shown above) which describes optimum coefficient k for each combination of the ambient temperature and the internal temperature (target value). In steps S011 in FIG. 7B and FIG. 10B, or in step S215 in FIGS. 11B, 13B, and 14B, before calculation of target rotation speed A, control section 92 acquires detection value ST of the ambient temperature from second temperature sensor Se2, and target value SV of the internal temperature stored in non-volatile memory 91 or others, and acquires, from the table, and determines coefficient k corresponding to a combination of detection value ST of the ambient temperature and target value SV of the internal temperature thus acquired (in other words, correspondence relation between rotation speeds A and B). Note that control section 92 obtains coefficient k by the interpolation process described above when coefficient k corresponding to detection value ST of the ambient temperature and target value SV of the internal temperature thus acquired is not described in the table.

Control section 92 calculates target rotation speed A in step S011 in FIGS. 7B and 10B, or in step S215 in FIGS. 11B, 13B, and 14B by utilizing coefficient k obtained as described above. In this manner, the total power consumption in the internal temperature control can be minimized.

2-21. Various Safety Functions of Present Refrigeration Apparatus 1 (Example 1)

As described above, each of first power supply section 612H and second power supply section 712L includes an inverter circuit. This inverter circuit has a built-in protection function in some cases. For example, first power supply section 612H and second power supply section 712L output a first abnormal signal and a second abnormal signal, respectively, to control section 92 at the time of a failure of start of first motor 61H and second motor 72L, an abnormal operation such as an excessive load, a flow of large current, or on other occasions.

Control section 92 executes interruption processing or the like in consideration that second cooling section 7L is operating in a high-load state when receiving the first abnormal signal from first power supply section 612H during output of control signals CS1H and CS2L to power supply sections 612H and 712L, respectively, to instruct operations of both compressors 61H and 71L. In the interruption processing or the like, control section 92 reduces the operation speed of second compressor 71L causing a high load to a speed lower than the previous speed, confirms an elapse of a fixed time or cancellation of the abnormal signal, and returns the operation speed to the original speed. Alternatively, control section 92 temporarily stops operation of second compressor 71L, and restarts second compressor 71L after an elapse of a fixed time.

On the other hand, control section 92 having received the second abnormal signal reduces the operation speed of second compressor 71L to a speed lower than the previous speed, confirms an elapse of a fixed time or cancellation of the abnormal signal, and returns the operation speed to the original speed. Alternatively, control section 92 temporarily stops operation of second compressor 71L, and restarts second compressor 71L after an elapse of a fixed time.

2-22. Various Safety Functions of Present Refrigeration Apparatus 1 (Example 2)

Moreover, in Example 1 through Example 5 of the internal temperature control, control section 92 regularly acquires a detection value of the temperature of cascade condenser 8 from at least either one of third temperature sensor Se3 and fourth temperature sensor Se4, and performs such control as to return the acquired detection value to a temperature within a predetermined temperature range when determining that the acquired detection value is a value out of the predetermined temperature range. The predetermined temperature range herein is a temperature range intended to be maintained by cascade condenser 8 for protection of the compressors. In a specific example, control section 92 changes or adjusts to zero at least either one of the rotation speed of first compressor 61H and the rotation speed of second compressor 71L when the detection value of the temperature of cascade condenser 8 is lower than a lower limit value in the predetermined temperature range.

2-23. Various Safety Functions of Present Refrigeration Apparatus 1 (Example 3)

In addition to the above description, in Example 1 through Example 5 of the internal temperature control, control section 92 regularly acquires a detection value of the second refrigerant temperature from third temperature sensor Se3 during operations of first compressor 61H and second compressor 71L, and performs such control as to return the acquired detection value to a temperature within a predetermined temperature range when determining that the acquired detection value is a value out of the predetermined temperature range. In a specific example, control section 92 changes or adjusts to zero at least either one of the rotation speed of first compressor 61H and the rotation speed of second compressor 71L when the detection value of the second refrigerant temperature is lower than a lower limit value in the predetermined temperature range.

2-24. Various Safety Functions of Present Refrigeration Apparatus 1 (Example 4)

In addition to the above description, in Example 1 through Example 5 of the internal temperature control, control section 92 regularly acquires a detection value of the first compressor temperature and a detection value of the second compressor temperature from fifth temperature sensor Se5 and sixth temperature sensor Se6, respectively, during operations of first compressor 61H and second compressor 71L. When determining that at least one of the acquired detection values is higher than or equal to a predetermined temperature, control section 92 reduces or sets to zero the rotation speed or speeds of at least one or both of first compressor 61H and second compressor 71L, in consideration that at least either first compressor 61H or second compressor 71L is an abnormal overheat state. When determining that at least one of the acquired detection values is higher than or equal to the predetermined temperature, control section 92 may further change the rotation speed of motor 68H for fan 67H to a speed higher than the previous speed.

The disclosure of Japanese Patent Application No. 2016-028126, filed on Feb. 17, 2016, including the specification, drawings, and abstract, is incorporated herein by reference in its entirety.

INDUSTRIAL APPLICABILITY

A refrigeration apparatus according to the present invention is capable of rapidly returning a temperature of a storage space, and is suitable for an ultra-deep freezer or the like.

REFERENCE SIGNS LIST

1 Refrigeration apparatus
S Storage space
6H First cooling section
61H First compressor
611H First motor
612H First power supply section
62H First front stage condenser
63H First rear stage condenser
64H First expander
65H First evaporator
66H First fluid circuit
67H Fan
68H Motor
7L Second cooling section
71L Second compressor
711L Second motor
712L Second power supply section
72L Second front stage condenser
73L Second rear stage condenser
74L Second expander
75L Second evaporator
76L Second fluid circuit
8 Cascade condenser
92 Control section
Se1 First temperature sensor (internal temperature sensor)
Se2 Second temperature sensor (ambient temperature sensor)
Se3 Third temperature sensor (second fluid circuit temperature sensor)
Se4 Fourth temperature sensor (cascade temperature sensor)

The invention claimed is:

1. A refrigeration apparatus comprising:
a first cooling section disposed such that a first compressor, a first condenser, a first expander, and a first evaporator achieve fluid communication with one another in a first fluid circuit through which a first refrigerant circulates;
a second cooling section disposed such that a second compressor, a second condenser that constitutes a cascade condenser in cooperation with the first evaporator, a second expander, and a second evaporator achieve fluid communication with one another in a second fluid circuit through which a second refrigerant circulates;
a storage section that includes a storage space for a cooling target cooled by the second evaporator;
an internal temperature sensor that detects a temperature of the storage space;
a control section that determines a second rotation speed of the second compressor based on a target temperature of the storage space and a detection result obtained by the internal temperature sensor, and determines a first rotation speed of the first compressor, the first rotation speed having a predetermined correspondence relation with the second rotation speed, wherein the controller section is configured to determine the first rotation speed of the first compressor based on the determined second rotation speed of the second compressor; and
a first power supply section and a second power supply section that supply power to the first compressor and the second compressor, respectively, based on the first rotation speed and the second rotation speed determined by the control section, respectively.

2. The refrigeration apparatus according to claim 1, wherein the first rotation speed has a positive correlation relation with the second rotation speed.

3. The refrigeration apparatus according to claim 1, wherein the control section determines the second rotation speed by any one of proportional control, proportional and integral control, and proportional, integral, and differential control, each based on the target temperature of the storage space and the detection result obtained by the internal temperature sensor, and determines the first rotation speed that has a proportional relation with the second rotation speed.

4. The refrigeration apparatus according to claim 1, wherein the control section determines the first rotation speed and the second rotation speed when the detection result obtained by the internal temperature sensor becomes lower than or equal to a predetermined temperature reference value, or when a deviation between the detection result obtained by the internal temperature sensor and the target temperature of the storage space becomes smaller than or equal to a first deviation reference value.

5. The refrigeration apparatus according to claim 1, further comprising an ambient temperature sensor that detects an ambient temperature of the apparatus,
wherein the control section determines the predetermined correspondence relation based on the target temperature of the storage space, and a detection result obtained by the ambient temperature sensor.

6. The refrigeration apparatus according to claim 1, wherein:
the first power supply section and the second power supply section further output a first abnormal signal and a second abnormal signal, respectively, to the control section, the first abnormal signal indicating an abnormal state of the first power supply section, and the second abnormal signal indicating an abnormal state of the second power supply section; and
the control section temporarily reduces the second rotation speed at the time of reception of the first abnormal signal or the second abnormal signal after determination of the first rotation speed and the second rotation speed.

7. The refrigeration apparatus according to claim 1, further comprising a second fluid circuit temperature sensor that detects a temperature of the second fluid circuit,
wherein the control section changes at least either the first rotation speed or the second rotation speed to adjust a detection result obtained by the second fluid circuit temperature sensor to a value falling within a predetermined temperature range during an operation of at least either the first compressor or the second compressor.

8. The refrigeration apparatus according to claim 7, wherein:
the second fluid circuit temperature sensor detects a temperature of the second refrigerant at an outlet of the second condenser that constitutes the cascade condenser; and
the control section changes at least either the first rotation speed or the second rotation speed to adjust the detection result obtained by the second fluid circuit temperature sensor to a value falling within a predetermined temperature range during an operation of at least either the first compressor or the second compressor.

9. The refrigeration apparatus according to claim 1, further comprising a fan that rotates at a number of rotations corresponding to the first rotation speed or the second rotation speed to supply an airflow to the first condenser.

10. The refrigeration apparatus according to claim 1, further comprising a fan that rotates at a number of rotations corresponding to a temperature of at least the first compressor or the second compressor to supply an airflow to the first condenser.

11. The refrigeration apparatus according to claim 1, wherein the control section designates a low value as the rotation speed of at least either the first compressor or the second compressor when a temperature of at least either the first compressor or the second compressor becomes higher than or equal to a predetermined temperature.

12. The refrigeration apparatus according to claim 1, wherein:
in a state that both the first compressor and the second compressor stop, the first power supply section supplies power to the first compressor to start operation of the first compressor at a first target rotation speed; and
after an elapse of a predetermined time from the start of the first compressor, the second power supply section supplies power to the second compressor to start operation of the second compressor at a second target rotation speed.

13. The refrigeration apparatus according to claim 1, wherein:
when a deviation between the detection result obtained by the internal temperature sensor and the target temperature of the storage space becomes larger than or equal to a second deviation reference value in a state that both the first compressor and the second compressor stop, the first power supply section supplies power to the first compressor to start the first compressor; and
after an elapse of a predetermined time delay from the start of the first compressor, the second power supply section supplies power to the second compressor to start the second compressor.

14. The refrigeration apparatus according to claim 1, further comprising the second fluid circuit temperature sensor, wherein:
in a state that both the first compressor and the second compressor stop, the first power supply section supplies power to the first compressor to start the first compressor; and
when a detection result obtained by the second fluid circuit temperature sensor becomes lower than or equal to a predetermined temperature, the second power supply section supplies power to the second compressor to start the second compressor.

* * * * *